(12) United States Patent
Bai et al.

(10) Patent No.: US 11,974,230 B2
(45) Date of Patent: Apr. 30, 2024

(54) INDICATING UPLINK POWER CONTROL PARAMETERS

(71) Applicant: QUALCOMM Incorporated, San Diego, CA (US)

(72) Inventors: Tianyang Bai, Somerville, NJ (US); Yan Zhou, San Diego, CA (US); Junyi Li, Fairless Hills, PA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/900,566

(22) Filed: Aug. 31, 2022

(65) Prior Publication Data

US 2023/0217372 A1    Jul. 6, 2023

Related U.S. Application Data

(60) Provisional application No. 63/266,423, filed on Jan. 5, 2022.

(51) Int. Cl.
| | |
|---|---|
| *H04W 52/32* | (2009.01) |
| *H04L 5/00* | (2006.01) |
| *H04W 52/14* | (2009.01) |
| *H04W 52/54* | (2009.01) |

(52) U.S. Cl.
CPC ......... *H04W 52/146* (2013.01); *H04L 5/0051* (2013.01); *H04W 52/325* (2013.01); *H04W 52/54* (2013.01)

(58) Field of Classification Search
CPC . H04W 52/146; H04W 52/325; H04W 52/54; H05L 5/0051; H04L 5/0051
See application file for complete search history.

(56) References Cited

U.S. PATENT DOCUMENTS

| | | | |
|---|---|---|---|
| 2021/0195530 A1* | 6/2021 | Venugopal | H04W 52/32 |
| 2021/0219246 A1* | 7/2021 | Xu | H04L 1/1819 |
| 2022/0039022 A1* | 2/2022 | Liu | H04W 52/38 |
| 2022/0279460 A1* | 9/2022 | Zhang | H04W 16/28 |
| 2022/0295417 A1 | 9/2022 | Sun et al. | |
| 2022/0330167 A1* | 10/2022 | Chen | H04W 72/23 |

FOREIGN PATENT DOCUMENTS

| | | |
|---|---|---|
| WO | 2021027805 A1 | 2/2021 |
| WO | 2021147001 A1 | 7/2021 |

OTHER PUBLICATIONS

International Search Report and Written Opinion—PCT/US2022/080558—ISA/EPO—dated Apr. 6, 2023.

* cited by examiner

*Primary Examiner* — John J Lee
(74) *Attorney, Agent, or Firm* — Harrity & Harrity, LLP

(57) ABSTRACT

Various aspects of the present disclosure generally relate to wireless communication. In some aspects, a user equipment (UE) may determine, for a sounding reference signal (SRS) transmission, one or more uplink power control parameters based at least in part on whether the one or more uplink power control parameters are associated with a transmission configuration indicator (TCI) state that is associated with at least one of an uplink control channel or an uplink shared channel. The UE may transmit the SRS transmission based at least in part on the one or more uplink power control parameters. Numerous other aspects are described.

30 Claims, 11 Drawing Sheets

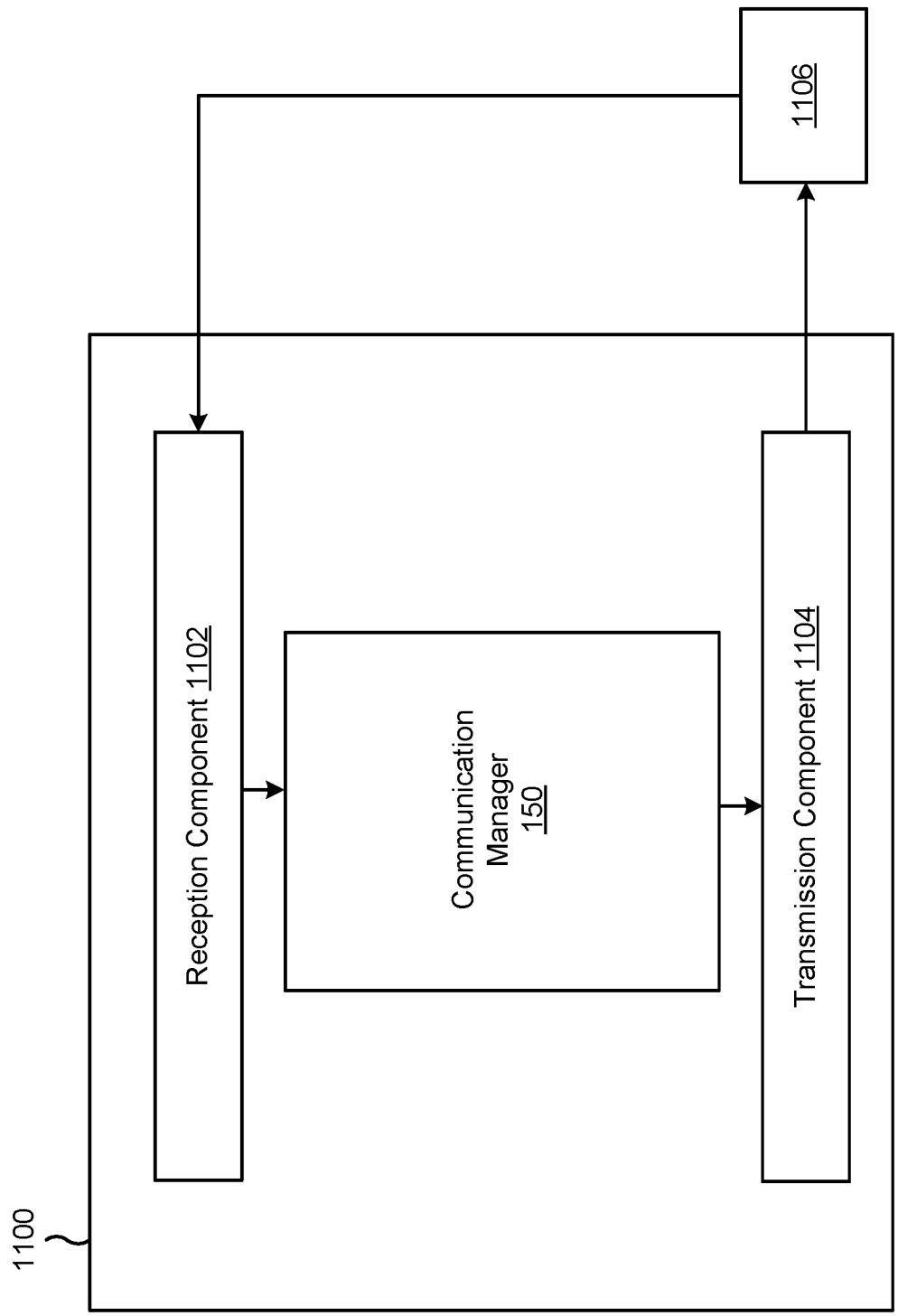

INDICATING UPLINK POWER CONTROL PARAMETERS

CROSS-REFERENCE TO RELATED APPLICATION

This patent application claims priority to U.S. Provisional Patent Application No. 63/266,423, filed on Jan. 5, 2022, entitled "INDICATING UPLINK POWER CONTROL PARAMETERS," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for indicating uplink power control parameters.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include determining, for a sounding reference signal (SRS) transmission, one or more uplink power control parameters based at least in part on whether the one or more uplink power control parameters are associated with a transmission configuration indicator (TCI) state that is associated with at least one of an uplink control channel or an uplink shared channel. The method may include transmitting the SRS transmission based at least in part on the one or more uplink power control parameters.

Some aspects described herein relate to a method of wireless communication performed by a base station. The method may include transmitting, for an SRS transmission, an indication of one or more uplink power control parameters based at least in part on whether the one or more uplink power control parameters are associated with a TCI state that is associated with at least one of an uplink control channel or an uplink shared channel. The method may include receiving the SRS transmission based at least in part on the one or more uplink power control parameters.

Some aspects described herein relate to a UE for wireless communication. The user equipment may include a memory and one or more processors coupled to the memory. The memory may include instructions executable by the one or more processors to cause the UE to determine, for an SRS transmission, one or more uplink power control parameters based at least in part on whether the one or more uplink power control parameters are associated with a TCI state that is associated with at least one of an uplink control channel or an uplink shared channel. The memory may include instructions executable by the one or more processors to cause the UE to transmit the SRS transmission based at least in part on the one or more uplink power control parameters.

Some aspects described herein relate to a base station for wireless communication. The base station may include a memory and one or more processors coupled to the memory. The memory may include instructions executable by the one or more processors to cause the base station to transmit, for an SRS transmission, an indication of one or more uplink power control parameters based at least in part on whether the one or more uplink power control parameters are associated with a TCI state that is associated with at least one of an uplink control channel or an uplink shared channel. The memory may include instructions executable by the one or more processors to cause the base station to receive the SRS transmission based at least in part on the one or more uplink power control parameters.

Some aspects described herein relate to a non-transitory computer-readable medium that stores a set of instructions for wireless communication by a UE. The set of instructions, when executed by one or more processors of the UE, may cause the UE to determine, for an SRS transmission, one or more uplink power control parameters based at least in part on whether the one or more uplink power control parameters are associated with a TCI state that is associated with at least one of an uplink control channel or an uplink shared channel. The set of instructions, when executed by one or more processors of the UE, may cause the UE to transmit the SRS transmission based at least in part on the one or more uplink power control parameters.

Some aspects described herein relate to a non-transitory computer-readable medium that stores a set of instructions for wireless communication by a base station. The set of instructions, when executed by one or more processors of the base station, may cause the base station to transmit, for an SRS transmission, an indication of one or more uplink power control parameters based at least in part on whether the one or more uplink power control parameters are associated with a TCI state that is associated with at least one of an uplink control channel or an uplink shared channel. The set of instructions, when executed by one or more processors of the base station, may cause the base station to receive the SRS transmission based at least in part on the one or more uplink power control parameters.

Some aspects described herein relate to an apparatus for wireless communication. The apparatus may include means for determining, for an SRS transmission, one or more uplink power control parameters based at least in part on whether the one or more uplink power control parameters are associated with a TCI state that is associated with at least one of an uplink control channel or an uplink shared channel. The apparatus may include means for transmitting the SRS transmission based at least in part on the one or more uplink power control parameters.

Some aspects described herein relate to an apparatus for wireless communication. The apparatus may include means for transmitting, for an SRS transmission, an indication of one or more uplink power control parameters based at least in part on whether the one or more uplink power control parameters are associated with a TCI state that is associated with at least one of an uplink control channel or an uplink shared channel. The apparatus may include means for receiving the SRS transmission based at least in part on the one or more uplink power control parameters.

Aspects generally include a method, apparatus, system, computer program product, non-transitory computer-readable medium, user equipment, base station, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIGS. 10 and 11 are diagrams of example apparatuses for wireless communication, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
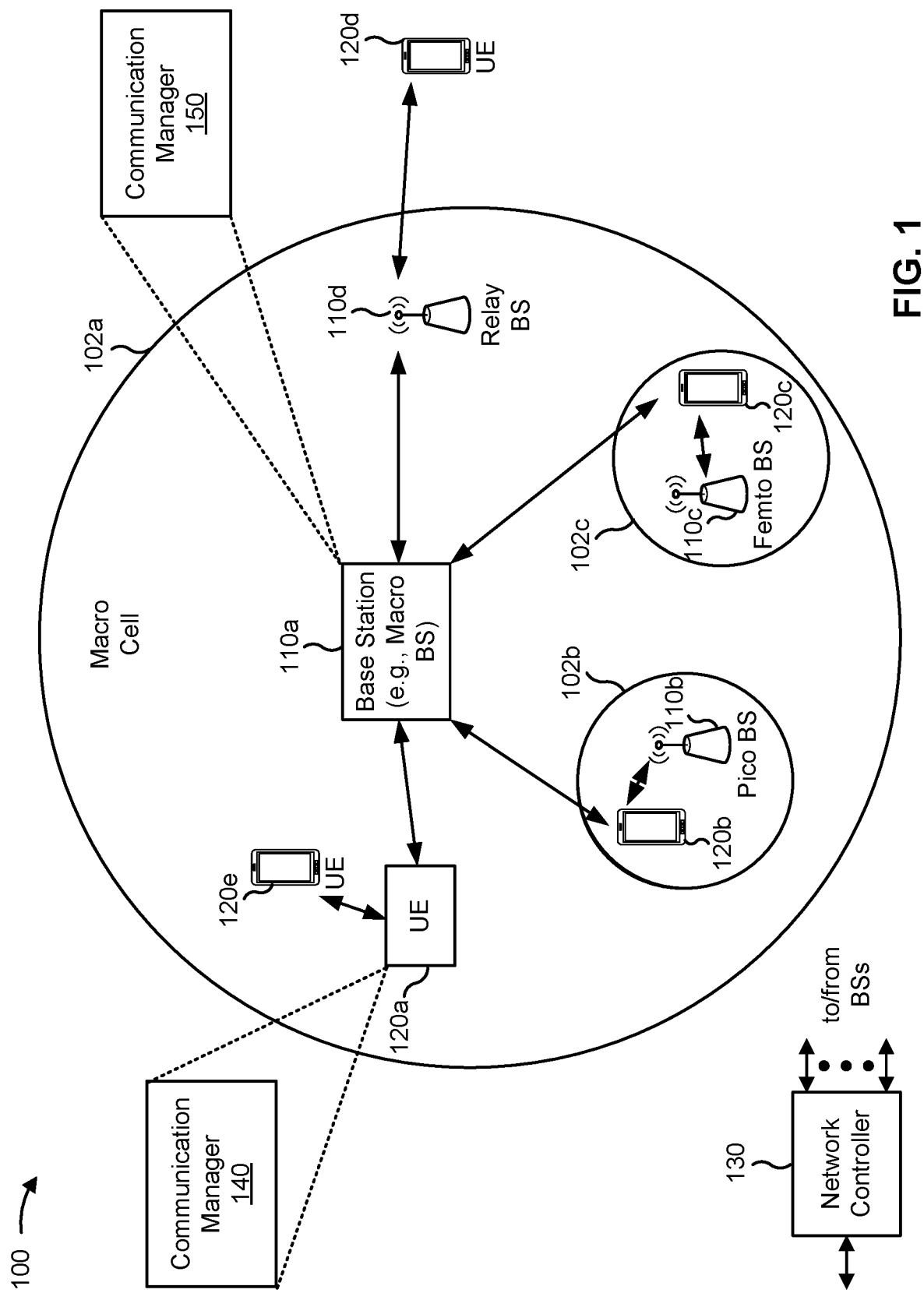
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network node" may refer to an aggregated base station, a disaggregated base station, an integrated access and backhaul (IAB) node, a relay node, and/or one or more components thereof. For example, in some aspects, "base station" or "network node" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station" or "network node" may refer to one device configured to perform one or more functions, such as those described herein in connection with the base station 110. In some aspects, the term "base station" or "network node" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station" or "network node" may refer to any one or more of those different devices. In some aspects, the term "base station" or "network node" may refer to one or more virtual base stations and/or one or more virtual base station functions. For example, in some aspects, two or more base station functions may be instantiated on a single device. In some aspects, the term "base station" or "network node" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may determine, for a sounding reference signal (SRS) transmission, one or more uplink power control parameters based at least in part on whether the one or more uplink power control parameters are associated with a transmission configuration indicator (TCI) state that is associated with at least one of an uplink control channel or an uplink shared channel; and transmit the SRS transmission based at least in part on the one or more uplink power control parameters. Additionally, or alternatively, the communication manager 140 may perform one or more other operations described herein.

In some aspects, the base station 110 may include a communication manager 150. As described in more detail elsewhere herein, the communication manager 150 may transmit, for an SRS transmission, an indication of one or more uplink power control parameters based at least in part on whether the one or more uplink power control parameters are associated with a TCI state that is associated with at least one of an uplink control channel or an uplink shared channel; and receive the SRS transmission based at least in part on the one or more uplink power control parameters.

Additionally, or alternatively, the communication manager 150 may perform one or more other operations described herein.

As indicated above, FIG. 1 is provided as an example. Other examples may differ from what is described with regard to FIG. 1.

Figure 2:
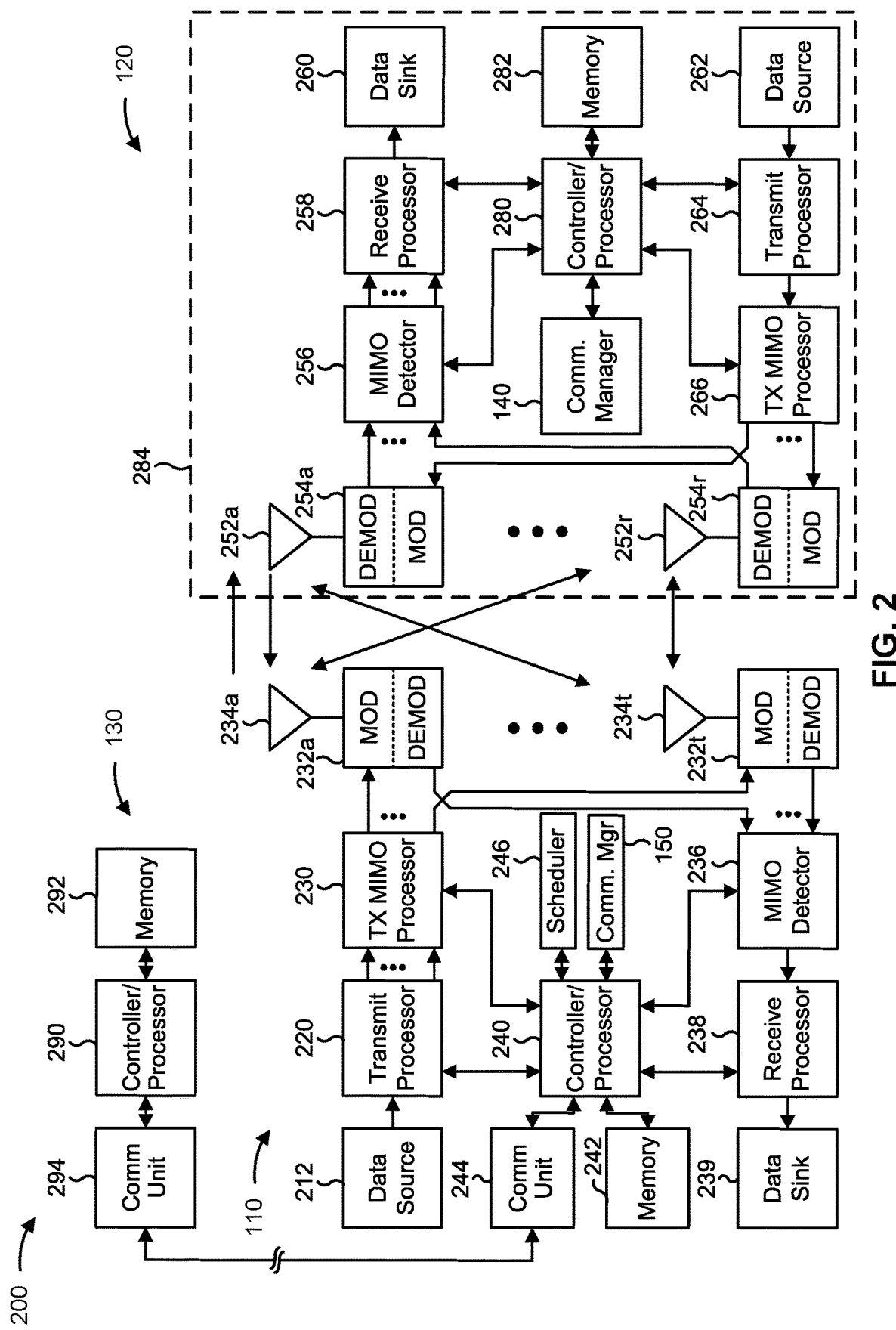
FIG. 2 is a diagram illustrating an example of a base station in communication with a user equipment (UE) in a wireless network, in accordance with the present disclosure.

FIG. 2 is a diagram illustrating an example 200 of a base station 110 (e.g., a network node) in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-11).

The controller/processor 240 of the base station 110, the controller/processor 280 of the UE 120, and/or any other component(s) of FIG. 2 may perform one or more techniques associated with indicating uplink power control parameters, as described in more detail elsewhere herein. For example, the controller/processor 240 of the base station 110, the controller/processor 280 of the UE 120, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the UE 120 includes means for determining, for an SRS transmission, one or more uplink power control parameters based at least in part on whether the one or more uplink power control parameters are associated with a TCI state that is associated with at least one of an uplink control channel or an uplink shared channel; and/or means for transmitting the SRS transmission based at least in part on the one or more uplink power control parameters. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, for an SRS transmission, an indication of one or more uplink power control parameters based at least in part on whether the one or more uplink power control parameters are associated with a TCI state that is associated with at least one of an uplink control channel or an uplink shared channel; and/or means for receiving the SRS transmission based at least in part on the one or more uplink power control parameters. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
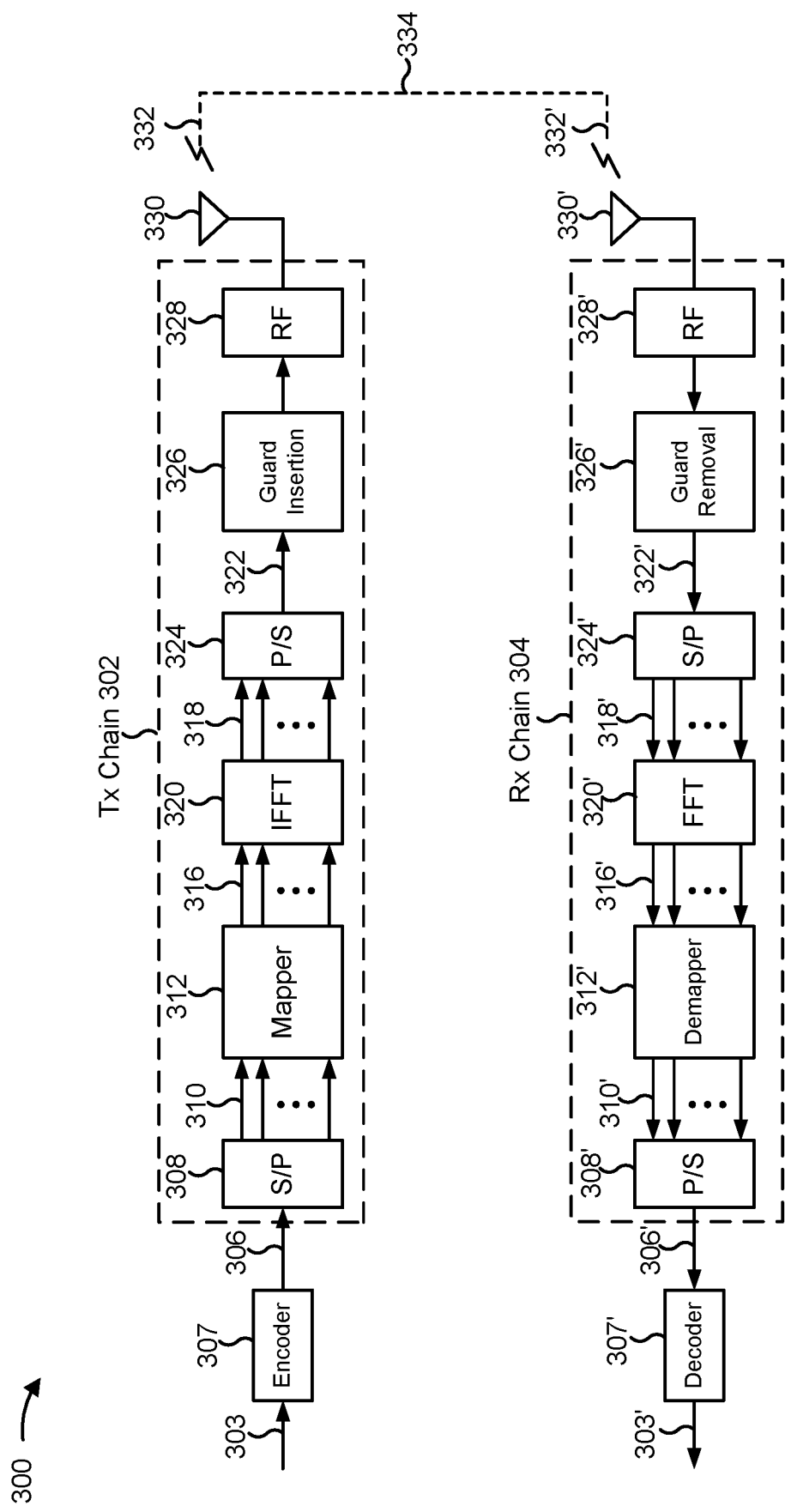
FIG. 3 is a diagram illustrating an example of a transmit (Tx) chain and a receive (Rx) chain of a UE, in accordance with the present disclosure.

FIG. 3 is a diagram illustrating an example 300 of a transmit (Tx) chain 302 and a receive (Rx) chain 304 of a UE 120, in accordance with the present disclosure. In some aspects, one or more components of Tx chain 302 may be implemented in transmit processor 264, TX MIMO processor 266, modem 254, and/or controller/processor 280, as described above in connection with FIG. 2. In some aspects, Tx chain 302 may be implemented in UE 120 for transmitting data 306 (e.g., uplink data, an uplink reference signal, and/or uplink control information) to a base station 110 (e.g., a network node) on an uplink channel.

An encoder 307 may alter a signal (e.g., a bitstream) 303 into data 306. Data 306 to be transmitted is provided from encoder 307 as input to a serial-to-parallel (S/P) converter 308. In some aspects, S/P converter 308 may split the transmission data into N parallel data streams 310.

The N parallel data streams 310 may then be provided as input to a mapper 312. Mapper 312 may map the N parallel data streams 310 onto N constellation points. The mapping may be done using a modulation constellation, such as binary phase-shift keying (BPSK), quadrature phase-shift keying (QPSK), 8 phase-shift keying (8PSK), quadrature amplitude modulation (QAM), etc. Thus, mapper 312 may output N parallel symbol streams 316, each symbol stream 316 corresponding to one of N orthogonal sub carriers of an inverse fast Fourier transform (IFFT) component 320. These N parallel symbol streams 316 are represented in the frequency domain and may be converted into N parallel time domain sample streams 318 by IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of guard insertion component 326 may then be upconverted to a desired transmit frequency band by a radio frequency (RF) front end 328. An antenna 330 may then transmit the resulting signal 332.

In some aspects, Rx chain 304 may utilize OFDM/OFDMA. In some aspects, one or more components of Rx chain 304 may be implemented in receive processor 258, MIMO detector 256, modem 254, and/or controller/processor 280, as described above in connection with FIG. 2. In some aspects, Rx chain 304 may be implemented in UE 120 for receiving data 306 (e.g., downlink data, a downlink reference signal, and/or downlink control information) from a base station 110 on a downlink channel.

A transmitted signal 332 is shown traveling over a wireless channel 334 from Tx chain 302 to Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by guard insertion component 326.

The output of guard removal component 326' may be provided to an S/P converter 324'. The output may include an OFDM/OFDMA symbol stream 322', and S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by mapper 312, thereby outputting N parallel data streams 310'. A P/S converter 308' may combine the N parallel data streams 310' into a single data stream 306'. Ideally, data stream 306' corresponds to data 306 that was provided as input to Tx chain 302. Data stream 306' may be decoded into a decoded data stream 303' by decoder 307'.

In some aspects, the UE 120 may determine or configure one or more parameters for the transmit Tx chain 302 for uplink transmit power control. For example, the UE 120 may determine one or more uplink power control parameters for the transmit Tx chain 302. The UE 120 may adjust or configure one or more of the components in the Tx chain 302 based at least in part on the one or more uplink power control parameters, for example, to satisfy a particular transmit power threshold, to satisfy a signal to interference plus noise ratio (SINR) threshold, and/or to satisfy another threshold. The one or more uplink power control parameters may be configured for an uplink transmission, such as an SRS transmission, a physical uplink shared channel (PUSCH) transmission, a physical uplink control channel (PUCCH) transmission, and/or another type of uplink transmission. The one or more uplink power control parameters may include, for example, a PO parameter, an alpha parameter, a closed loop index parameter, a pathloss reference signal (PL RS) parameter, and/or another parameter.

A PO parameter may include an uplink power control parameter that represents a target received power (e.g., for a receiver of an uplink transmission). An alpha parameter may include an uplink power control parameter that represents a compensation factor (e.g., a pathloss compensation factor) in a power control formula for the Tx chain 302. The closed loop index (CLI) parameter may include an uplink power control parameter that indicates a transmit power command (TCP) index that is to be applied to one or more closed power control loops in the Tx chain 302. In some aspects, the pathloss reference signal parameter indicates an amount of pathloss (e.g., an amount of signal power lost during transmission to a base station 110). In some aspects, the pathloss reference signal parameter indicates a resource that is to be measured by the UE 120 to perform power control for the Tx chain 302. For example, the pathloss reference signal parameter may indicate a reference signal that is to be measured for pathloss estimation and power control estimation for a corresponding uplink channel.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
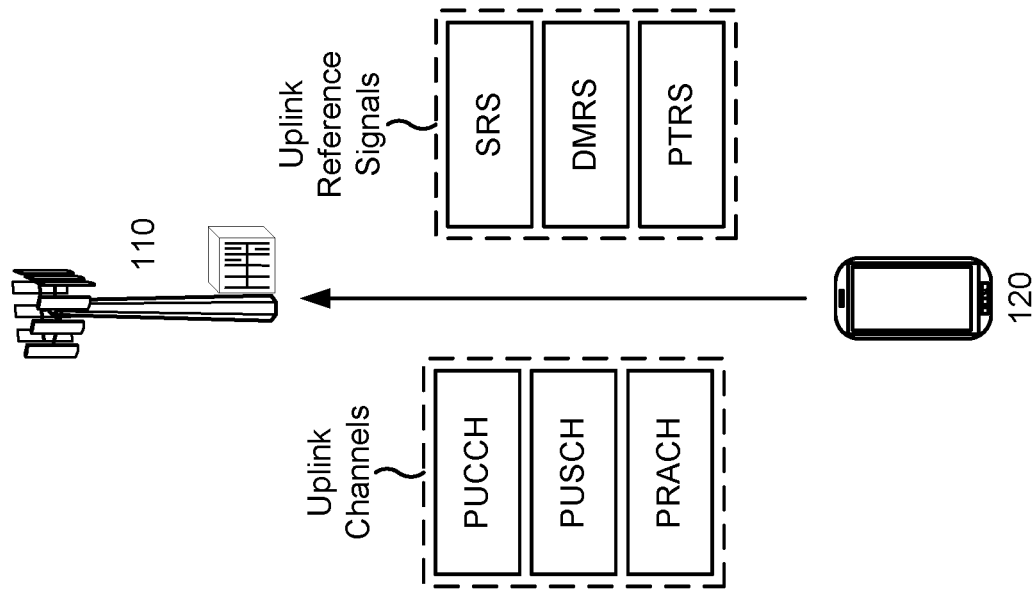
FIG. 4 is a diagram illustrating an example of physical channels and reference signals in a wireless network, in accordance with the present disclosure.
Figure 4:
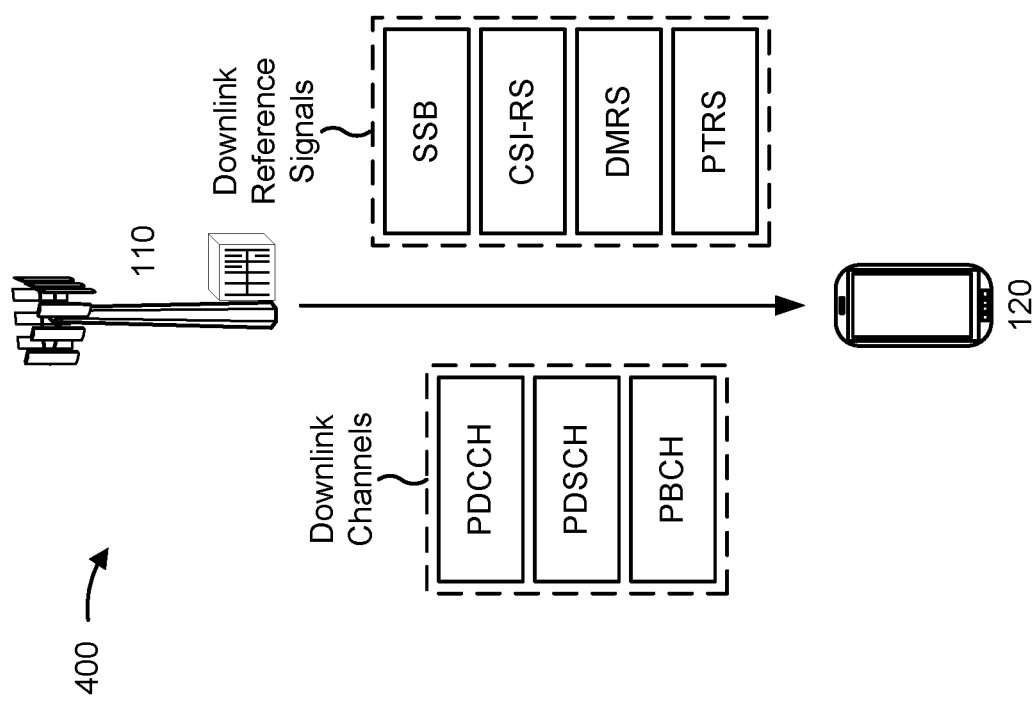

FIG. 4 is a diagram illustrating an example 400 of physical channels and reference signals in a wireless network, in accordance with the present disclosure. As shown in FIG. 4, downlink channels and downlink reference signals may carry information from a base station 110 (e.g., a network node) to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a PUCCH that carries uplink control information (UCI), a PUSCH that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include an SRS, a DMRS, or a PTRS, among other examples.

An SSB may carry information used for initial network acquisition and synchronization, such as a PSS, an SSS, a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary. As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random QPSK sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

In some aspects, one or more of the reference signals described in connection with FIG. 4 may be used or measured as a pathloss reference signal. For example, the base station 110 may transmit a CSI-RS (e.g., a periodic CSI-RS (P-CSI-RS) or another type of CSI-RS), an SSB, and/or another reference signal as a pathloss reference signal, and the UE 120 may perform one or more measurements of the pathloss reference signal for power control. The UE 120 may perform power control by estimating the pathloss between the UE 120 and the base station 110 based at least in part on the one or more measurements, and by using the estimated pathloss in a power control algorithm to adjust the Tx chain 302 of the UE 120.

As indicated above, FIG. 4 is provided as an example. Other examples may differ from what is described with regard to FIG. 4.

Figure 5:
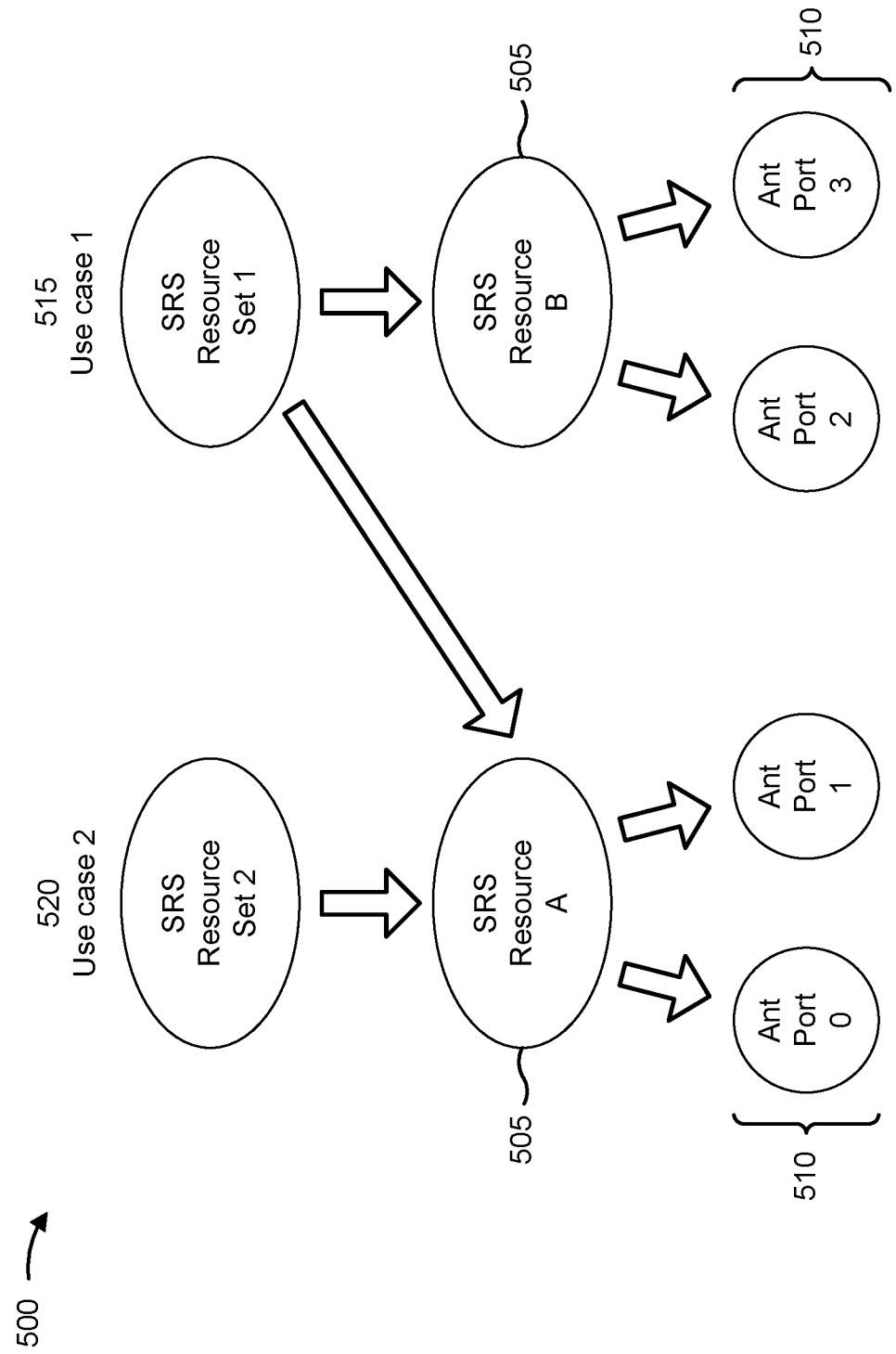
FIG. 5 is a diagram illustrating an example of sounding reference signal (SRS) resource sets, in accordance with the present disclosure.

FIG. 5 is a diagram illustrating an example 500 of SRS resource sets, in accordance with the present disclosure.

A base station 110 (e.g., a network node) may configure a UE 120 with one or more SRS resource sets to allocate resources for SRS transmissions by the UE 120. For example, a configuration for SRS resource sets may be indicated in a radio resource control (RRC) message (e.g., an RRC configuration message or an RRC reconfiguration message). As shown by reference number 505, an SRS resource set may include one or more resources (e.g., shown as SRS resources), which may include time resources and/or frequency resources (e.g., a slot, a symbol, a resource block, and/or a periodicity for the time resources).

As shown by reference number 510, an SRS resource may include one or more antenna ports on which an SRS is to be transmitted (e.g., in a time-frequency resource). Thus, a configuration for an SRS resource set may indicate one or more time-frequency resources in which an SRS is to be transmitted and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, or beam management.

An antenna switching SRS resource set may be used to indicate downlink CSI with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120). A guard period may be used and/or required between two consecutive SRS resources for antenna switching. In some aspects, the length of the guard period may be indicated in a standard specifications. The number of guard symbols in the guard period may depend on the tone spacing configuration of the OFDM symbols in the corresponding bandwidth part or component carrier. For instance, the guard period can be 2 OFDM symbols for 120 kHz tone spacing, 8 OFDM symbols for 480 kHz tone spacing, and 16 OFDM symbols for 960 tone spacing, while the numbers of OFDM symbols are chosen to make sure that the length of guard period remains the same for all tone spacing configurations. Additionally and/or alternatively, the UE 120 may report to a base station 110 the minimum length of the guard time between two consecutive SRS resources as a UE capability. The UE 120 may report the length for the guard period, in terms of the number of guard symbols. Additionally, the UE 120 may report a length for the guard time for each tone spacing of OFDM symbols.

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicated an uplink precoder to be used by the UE 120). For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used for indicating CSI for millimeter wave communications.

An SRS resource can be configured as periodic, semi-persistent (sometimes referred to as semi-persistent scheduling (SPS)), or aperiodic. A periodic SRS resource may be configured via a configuration message that indicates a periodicity of the SRS resource (e.g., a slot-level periodicity, where the SRS resources occurs every Y slots) and a slot offset. In some cases, a periodic SRS resource may always be activated, and may not be dynamically activated or deactivated. A semi-persistent SRS resource may also be configured via a configuration message that indicates a periodicity and a slot offset for the semi-persistent SRS resource, and may be dynamically activated and deactivated (e.g., using DCI or a medium access control (MAC) control element (CE) (MAC-CE)). An aperiodic SRS resource may be triggered dynamically, such as via DCI (e.g., UE-specific DCI or group common DCI) or a MAC-CE.

In some aspects, the UE 120 may be configured with a mapping between SRS ports (e.g., antenna ports) and corresponding SRS resources. The UE 120 may transmit an SRS on a particular SRS resource using an SRS port indicated in the configuration. In some aspects, an SRS resource may span N adjacent symbols within a slot (e.g., where N equals 1, 2, or 4). The UE 120 may be configured with X SRS ports (e.g., where X≤4). In some aspects, each of the X SRS ports may mapped to a corresponding symbol of the SRS resource and used for transmission of an SRS in that symbol.

As shown in FIG. 5, in some aspects, different SRS resource sets indicated to the UE 120 (e.g., having different use cases) may overlap (e.g., in time and/or in frequency, such as in the same slot). For example, as shown by reference number 515, a first SRS resource set (e.g., shown as SRS Resource Set 1) is shown as having a first use case (Use case 1). The first use case may include an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1 and may be transmitted in SRS Resource B (e.g., a second time-frequency resource) using antenna port 2 and antenna port 3.

As shown by reference number 520, a second SRS resource set (e.g., shown as SRS Resource Set 2) may have a second use case (Use case 2). The second use case may be a codebook use case. As shown, this example codebook SRS resource set includes only the first SRS resource (shown as SRS Resource A). Thus, codebook SRSs may be transmitted in SRS Resource A (e.g., the first time-frequency resource) using antenna port 0 and antenna port 1. In this case, the UE 120 may not transmit codebook SRSs in SRS Resource B (e.g., the second time-frequency resource) using antenna port 2 and antenna port 3.

As indicated above, FIG. 5 is provided as an example. Other examples may differ from what is described with regard to FIG. 5.

Figure 6:
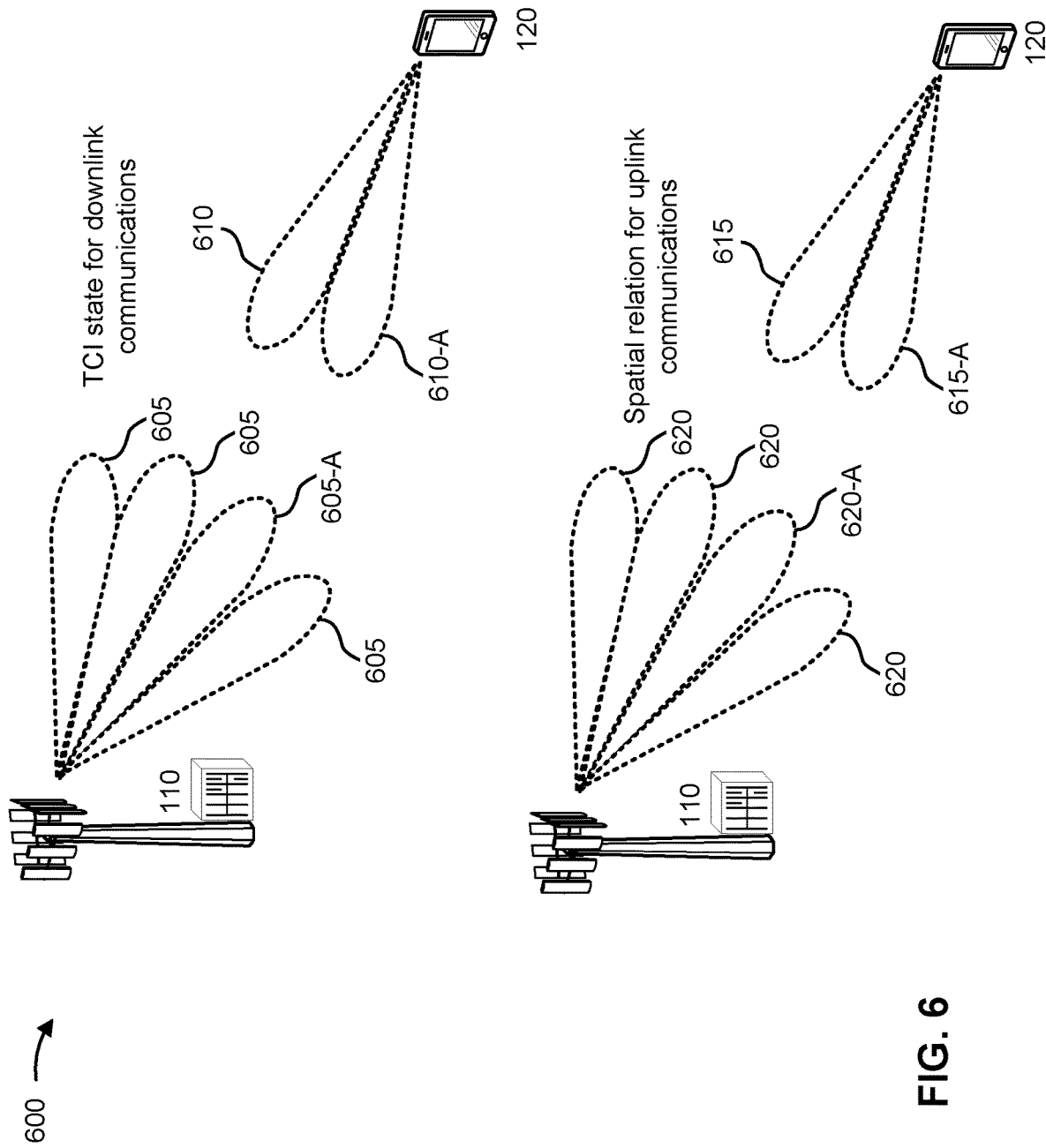
FIG. 6 is a diagram illustrating an example of using beams for communications between a base station and a UE, in accordance with the present disclosure.

FIG. 6 is a diagram illustrating an example 600 of using beams for communications between a base station and a UE, in accordance with the present disclosure. As shown in FIG. 6, a base station 110 (e.g., a network node) and a UE 120 may communicate with one another.

The base station 110 may transmit to UEs 120 located within a coverage area of the base station 110. The base station 110 and the UE 120 may be configured for beam-formed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 605.

The UE 120 may attempt to receive downlink transmissions via one or more UE receive beams 610, which may be configured using different beamforming parameters at receive circuitry of the UE 120. The UE 120 may identify a particular BS transmit beam 605, shown as BS transmit beam 605-A, and a particular UE receive beam 610, shown as UE receive beam 610-A, that provide relatively favorable performance (for example, that have a best channel quality of the different measured combinations of BS transmit beams 605 and UE receive beams 610). In some examples, the UE 120 may transmit an indication of which BS transmit beam 605 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 605-A and the UE receive beam 610-A), which may be further refined and maintained in accordance with one or more established beam refinement procedures.

A downlink beam, such as a BS transmit beam 605 or a UE receive beam 610, may be associated with an TCI state. A TCI state may indicate a directionality or a characteristic of the downlink beam, such as one or more quasi-colocation (QCL) properties of the downlink beam. A QCL property may include, for example, a Doppler shift, a Doppler spread, an average delay, a delay spread, or spatial receive parameters, among other examples. In some examples, each BS transmit beam 605 may be associated with an SSB, and the UE 120 may indicate a preferred BS transmit beam 605 by transmitting uplink transmissions in resources of the SSB that are associated with the preferred BS transmit beam 605. A particular SSB may have an associated TCI state (for example, for an antenna port or for beamforming). The base station 110 may, in some examples, indicate a downlink BS transmit beam 605 based at least in part on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 610 at the UE 120. Thus, the UE 120 may select a corresponding UE receive beam 610 from a set of BPLs based at least in part on the base station 110 indicating a BS transmit beam 605 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as an RRC message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 615.

The base station 110 may receive uplink transmissions via one or more BS receive beams 620. The base station 110 may identify a particular UE transmit beam 615, shown as UE transmit beam 615-A, and a particular BS receive beam 620, shown as BS receive beam 620-A, that provide relatively favorable performance (for example, that have a best channel quality of the different measured combinations of UE transmit beams 615 and BS receive beams 620). In some examples, the base station 110 may transmit an indication of which UE transmit beam 615 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 615-A and the BS receive beam 620-A), which may be further refined and maintained in accordance with one or more established beam refinement procedures. An uplink beam, such as a UE transmit beam 615 or a BS receive beam 620, may be associated with a spatial relation. A spatial relation may indicate a directionality or a characteristic of the uplink beam, similar to one or more QCL properties, as described above.

In some aspects, a unified framework for TCI may be implemented in a wireless network (e.g., the wireless network 100). For example, a joint TCI (which may also be referred to as a unified TCI) for uplink channels/signals and downlink channels/signals may shared for UE-dedicated reception on PDSCH/PDCCH and for transmission on PUSCH/PUCCH (e.g., for 3GPP Release 17 and/or beyond). A joint TCI state may replace spatial relation information (SpatialRelationInfo) (e.g., a 3GPP Release 15 or 16 SpatialRelationInfo) for indicating uplink spatial filter information. A joint TCI state may be updated in a MAC-CE, a DCI, and/or another downlink communication. For example, a downlink a non-UE dedicated PDCCH/PDSCH associated with a service cell physical cell identifier (PCI) or aperiodic CSI-RS (AP-CSI-RS) for beam management or for CSI may share a joint TCI state with UE-dedicated reception on a dynamic-grant configured PUSCH resource, a configured-grant PUCCH resource, and/or a dedicated PUCCH resource. As another example, an SRS for beam management, for antenna switching, for a codebook based transmission, or for a non-codebook based transmission may share a joint TCI state with a dynamic-grant configured PUSCH resource, a configured-grant PUSCH resource, and/ or a dedicated PUCCH resource. TCI state sharing may be configured via RRC or another type of downlink signaling.

An SRS resource (or SRS resource set) that is a valid target signal of a spatial relation may be configured as a target signal (e.g., a target reference signal) of an uplink TCI or of a joint TCI (e.g., an uplink and downlink TCI). This does not require a new type of source reference signal on top of the ones supported for uplink TCI and/or joint TCI. Moreover, this does not imply that downlink and uplink TCI state pools are separate or shared for separate downlink and uplink TCI states. A UE 120 is not required to support both the unified TCI framework and optional (e.g., 3GPP Release 15/16) features of SRS spatial relation information within a same band. In some cases, a UE 120 is not expected (or is not permitted) to be configured with spatial relation information (e.g., a 3GPP Release 15 or 16 SpatialRelationInfo) if the UE 120 is configured with a TCI (e.g., a 3GPP Release 17 TCI or beyond) in any component carrier in a band. The component carrier list for a multiple component carrier beam indication should not (or may not) contain any component carrier that is configured with a TCI. An SRS for beam management, for antenna switching, for a codebook based transmission, or for a non-codebook based transmission may share the same indicated TCI state (e.g., a 3GPP Release 17 or beyond joint TCI state) as a dynamic-grant configured PUSCH resource, a configured-grant PUSCH resource, and/or a dedicated PUCCH resource. The TCI state sharing may be based on an RRC configuration and/or another type of configuration. However, in some cases, an SRS may also use a different TCI state from an indicated TCI state for PUSCH/PUCCH.

For uplink power control, for the unified TCI framework, the configuration of uplink power control parameters (e.g., uplink power control parameters described above in FIG. 3) for SRS transmission may be associated with an uplink TCI state or a joint TCI state. If the uplink power control parameters for an SRS transmission are not associated with an uplink TCI state or a joint TCI state, the uplink power control parameters may be independent of an uplink TCI state or a joint TCI state per bandwidth part (BWP). If the uplink power control parameters for an SRS transmission (or a PUSCH/PUCCH transmission) are associated with an uplink TCI state or a joint TCI state per BWP, one individual setting may be associated with each uplink TCI state or each joint TCI state per BWP via RRC for each SRS transmission (or each PUSCH/PUCCH transmission).

In some cases (e.g., in 3GPP Release 16), uplink power control parameters for an SRS transmission may be configured by RRC on a per SRS resource set basis. Each uplink TCI state or joint TCI state may be associated with an uplink power control parameter set in RRC. In some cases (e.g., in 3GPP Release 17), uplink power control parameters may be channel dependent and optionally TCI state dependent in a BWP. Here, each uplink TCI state or joint TCI state may be associated with an uplink power control parameter set for SRS transmission. If an uplink power control parameter set is not associated with an uplink TCI state or a joint TCI state, the uplink power control parameter set may be configured for SRS independent of TCI state in a BWP.

As indicated above, FIG. 6 is provided as an example. Other examples may differ from what is described with respect to FIG. 6.

A base station (e.g., a network node) may want to configure SRS transmissions along a spatial direction with different uplink power control parameters such that the base station may test different uplink power control parameters to optimize uplink reception at the base station. In some cases, (e.g., in 3GPP Release 16), a base station may associate different SRS resource sets with the same spatial relationship information, but with different uplink power control parameters. However, in some cases (e.g., in 3GPP Release 17), uplink power control parameters may be associated with a TCI state (e.g., an uplink TCI state, a joint TCI state). As a result, if uplink power control parameter configuration for SRS always follows the associated TCI state, a coupling always exists between the uplink power control parameters and a spatial filter configuration for SRS. Thus, a base station may be unable to test different uplink power control parameters along the same spatial direction for uplink reception optimization. This may reduce flexibility in optimizing uplink reception at the base station, may reduce uplink reception quality, may increase a quantity of dropped uplink communications at the base station (e.g., because of the reduced uplink reception quality), and/or may increase retransmissions (which increases consumption of wireless network resources, power resources at the base station, memory resources at the base station, and/or processing resources at the base station), among other examples.

Some aspects described herein provide flexible techniques for indicating uplink power control parameters. The techniques described herein increase the flexibility in indicating different uplink power control parameters for SRS transmission, particularly in a wireless network in which a TCI state is used for uplink transmissions (e.g., an uplink TCI state that is shared for SRS transmissions and PUSCH/PUCCH transmissions, a joint TCI state that is shared for uplink transmissions and downlink transmissions). A base station (e.g., a base station 110) may indicate, and a UE (e.g., a UE 120) may determine, one or more uplink parameters for an SRS transmission. As described herein, the one or more uplink parameters may be based at least in part on whether the one or more uplink power control parameters are associated with a TCI state (e.g., an uplink TCI state, a joint TCI state). Thus, the base station is enabled to uncouple the uplink power control parameters form the TCI state. This enables the base station to configure and/or indicate different sets of uplink power control parameters for SRS transmissions in a spatial direction so that the base station may optimize uplink reception (e.g., by configuring the UE with an optimized set of uplink power control parameters) in the spatial direction. This may increase uplink reception quality and reliability at the base station, may decrease the quantity of dropped uplink transmissions at the base station, and/or may decrease retransmissions by the base station (which reduces consumption of wireless network resources, power resources at the base station, memory resources at the base station, and/or processing resources at the base station), among other examples.

Figure 7:
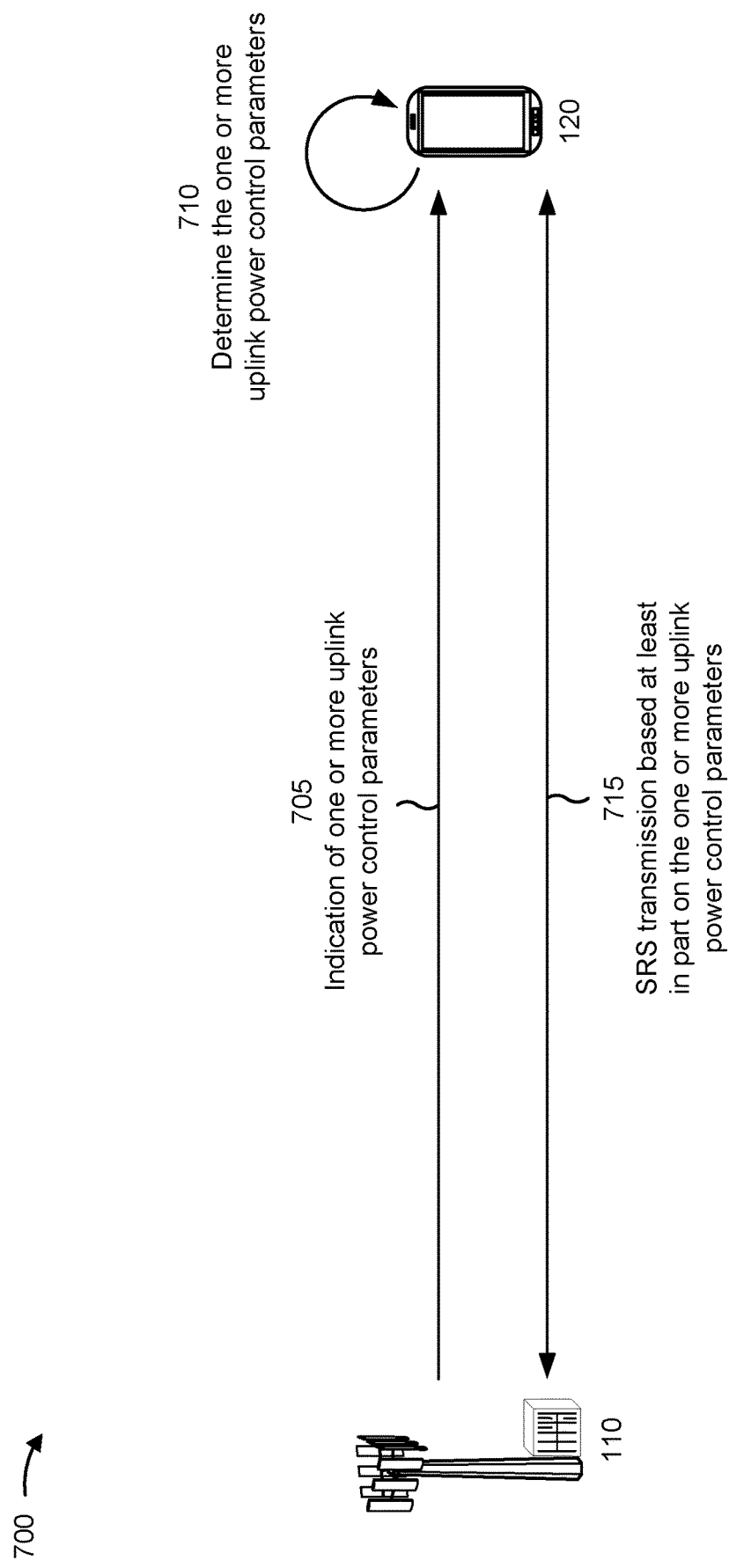
FIG. 7 is a diagram illustrating an example associated with indicating uplink power control parameters, in accordance with the present disclosure.

FIG. 7 is a diagram illustrating an example 700 of indicating uplink power control parameters, in accordance with the present disclosure. As shown in FIG. 7, the example 700 includes communication between a base station 110 (e.g., a network node) and a UE 120. The base station 110 and the UE 120 may be included in the wireless network 100. The base station 110 and the UE 120 may communicate on an access link in the wireless network 100. The access link may include an uplink and a downlink. The UE 120 may transmit uplink transmissions to the base station 110 on the uplink. The uplink transmissions may include PUSCH transmissions, PUCCH transmissions, SRS transmissions, and/or another type of uplink transmissions. The base station 110 may indicate uplink power control parameters to the UE 120, and the UE 120 may determine the uplink power control parameters, using the techniques described herein.

As shown by reference number 705, the base station may transmit (and the UE 120 may receive) an indication of one or more uplink power control parameters for an SRS transmission by the UE 120. As shown by reference number 710, the UE 120 may determine the one or more uplink power control parameters for the SRS transmission. In some aspects, the UE 120 determines the one or more uplink power control parameters for the SRS transmission based at least in part on the indication. The one or more uplink power control parameters may include one or more of the uplink power control parameters described above in FIG. 3 and/or another uplink power control parameter.

The indication of the one or more uplink power control parameters by the base station 110, and/or the determination of the one or more uplink power control parameters by the UE 120, may be based at least in part on whether the one or more uplink power control parameters are associated with a TCI state. The TCI state may include an uplink TCI state that is associated with an uplink control channel (e.g., a PUCCH) and/or an uplink shared channel (e.g., a PUSCH), a joint TCI state that is associated with an uplink channel and a downlink channel, and/or another type of TCI state. The base station 110 is enabled to decouple the one or more uplink power control parameters from the TCI state, which enables the base station 110 to selectively indicate uplink power control parameters that are or are not associated with the TCI state for the SRS transmission. This provides the base station 110 with increased flexibility to configure or schedule SRS transmissions by the UE 120 with different sets of uplink power control parameters in the same spatial direction.

In some aspects, where the one or more uplink power control parameters are not associated with the TCI state, the one or more uplink power control parameters (indicated by the base station 110 and determined by the UE 120) may be configured per SRS resource set. In these aspects, the UE 102 may determine, and the base station 110 may indicate, the one or more uplink power control parameters based at least in part on the SRS resource set associated with the SRS transmission. In other words, the UE 120 may determine the one or more uplink power control parameters, that are associated with the SRS resource set, as the one or more uplink power control parameters that are associated with the SRS transmission.

The base station 110 may indicate the one or more uplink power control parameters in an SRS resource set information element (IE) (e.g., in an RRC communication, a DCI communication, a MAC-CE communication, and/or another type of downlink communication). Additionally and/or alternatively, the base station 110 may indicate the one or more uplink power control parameters in a parameter set outside of an SRS resource set IE. For example, the base station 110 may configure a plurality of uplink power control parameter sets having different combinations of uplink power control parameter and/or uplink power control parameter values (or the sets may be configured in a wireless communication standard), and the base station 110 may indicate one of the uplink power control parameter sets in parameter set identifier field in a downlink communication to the UE 120. Each SRS resource set may be associated with an identifier of an uplink power control parameter set. This enables the base station 110 to reduce the quantity of overall uplink power control parameter sets that can be selected (which reduces complexity and overhead for indicating the one or more uplink power control parameters).

In some aspects, where the one or more uplink power control parameters are not associated with the TCI state, the one or more uplink power control parameters (indicated by the base station 110 and determined by the UE 120) may be configured per SRS resource. In these aspects, the UE 102 may determine, and the base station 110 may indicate, the one or more uplink power control parameters based at least in part on the SRS resource associated with the SRS transmission. In other words, the UE 120 may determine the one or more uplink power control parameters, that are associated with the SRS resource, as the one or more uplink power control parameters that are associated with the SRS transmission.

The base station 110 may indicate the one or more uplink power control parameters in an SRS resource IE (e.g., in an RRC communication, a DCI communication, a MAC-CE communication, and/or another type of downlink communication). Additionally and/or alternatively, the base station 110 may indicate the one or more uplink power control parameters in a parameter set outside of an SRS resource IE. For example, the base station 110 may configure a plurality of uplink power control parameter sets having different combinations of uplink power control parameter and/or uplink power control parameter values (or the sets may be configured in a wireless communication standard), and the base station 110 may indicate one of the uplink power control parameter sets in a parameter set identifier field in a downlink communication to the UE 120. Each SRS resource may be associated with an identifier of an uplink power control parameter set. This enables the base station 110 to reduce the quantity of overall uplink power control parameter sets that can be selected (which reduces complexity and overhead for indicating the one or more uplink power control parameters).

Alternatively, if uplink power control parameters are not configured per SRS resource, the UE 102 may determine, and the base station 110 may indicate, the one or more uplink power control parameters based at least in part on the SRS resource set in which the SRS resource is included. In other words, the UE 120 may determine the one or more uplink power control parameters, that are associated with the SRS resource set, as the one or more uplink power control parameters that are associated with the SRS transmission.

In some aspects, the base station 110 transmits (and the UE 120 receives) an indication of updated uplink power control parameter(s). This enables the base station 110 to update or modify relationships between updated uplink power control parameter(s), SRS resources, and/or SRS resource sets. The base station 110 may transmit an indication of updated uplink power control parameter(s) in an RRC communication, a DCI communication, a MAC-CE communication, and/or another type of downlink communication.

In some aspects, where the one or more uplink power control parameters are associated with the TCI state, the one or more uplink power control parameters (indicated by the base station 110 and determined by the UE 120) may be configured per TCI state in a BWP. In these aspects, the UE 102 may determine, and the base station 110 may indicate, the one or more uplink power control parameters based at least in part on the TCI state. In other words, the UE 120 may determine the one or more uplink power control parameters, that are associated with the TCI state, as the one or more uplink power control parameters that are associated with the SRS transmission. The UE 120 does not expect the one or more uplink control parameters to be configured in an SRS resource IE or in an SRS resource set IE, and refrains from determining the one or more uplink control parameters based at least in part on an SRS resource IE or in an SRS resource set IE. The base station 110 may indicate the TCI state in an RRC communication, a DCI communication, a MAC-CE communication, and/or another type of downlink communication.

Alternatively, different sets of uplink control parameters may be associated with the TCI state and an SRS resource IE (or an SRS resource set IE). Here, the UE 120 may use the one or more uplink power control parameters associated with the TCI state or may use the one or more uplink power control parameters associated with the SRS resource IE (or the SRS resource set IE). For example, the UE 120 may determine the one or more uplink power control parameters as the one or more uplink power control parameters that are associated with the TCI state, and may refrain from determining the one or more uplink power control parameters as the one or more other uplink power control parameters associated with the SRS resource IE (or the SRS resource set IE). As another example, the UE 120 may determine the one or more uplink power control parameters as the one or more uplink power control parameters that are associated with the SRS resource IE (or the SRS resource set IE), and may refrain from determining the one or more uplink power control parameters as the one or more other uplink power control parameters associated with the TCI state.

In some cases, the UE 120 may be capable of supporting one or more configurations for uplink power control parameter indication where different sets of uplink control parameters may be associated with the TCI state and an SRS resource IE (or an SRS resource set IE). For example, the UE 120 may be capable of supporting different sets of uplink control parameters may be associated with the TCI state and an SRS resource IE (or an SRS resource set IE). As another example, the UE 120 may be capable of supporting only uplink power control parameters that are indicated by the TCI state.

In some aspects, the UE 120 may transmit an indication of a capability to the base station 110. The indication of a capability may include an indication of whether the UE 120 supports different sets of uplink control parameters may be associated with the TCI state and an SRS resource IE (or an SRS resource set IE), or whether the UE 102 supports only uplink power control parameters that are indicated by the TCI state. The base station 110 may receive the indication of the capability and may indicate the one or more uplink power control parameters to the UE 120 based at least in part on the configuration. For example, the base station 110 may selectively indicate the one or more uplink control parameters that are associated with the TCI state or with an SRS resource IE (or an SRS resource set IE) based at least in part on the capability indicating that the UE 120 supports different sets of uplink control parameters may be associated with the TCI state and an SRS resource IE (or an SRS resource set IE). As another example, the base station 110 may indicate the one or more uplink control parameters that are associated with the TCI state based at least in part on the capability indicating that the UE 120 supports only uplink control parameters that are associated with the TCI state.

In some aspects, the indication of the one or more uplink power control parameters by the base station 110, and/or the determination of the one or more uplink power control parameters by the UE 120, may be based at least in part on whether the SRS resource associated with the SRS transmission shares the TCI state with the uplink control channel or the uplink shared channel, in addition to whether the one or more uplink power control parameters are associated with the TCI state. If the SRS resource associated with the SRS transmission shares the TCI state, the base station 110 may transmit the indication of the one or more uplink power control parameters and/or the UE 120 may determine the one or more uplink power control parameters based at least in part on whether the one or more uplink power control parameters are associated with the TCI state using the techniques described above. If the SRS resource associated with the SRS transmission does not share the TCI state (e.g., the SRS resource is associated with a different TCI state), the base station 110 may transmit the indication of the one or more uplink power control parameters and/or the UE 120 may determine the one or more uplink power control parameters based at least in part on the SRS resource set in which the SRS resource is included.

Alternatively, if the SRS resource associated with the SRS transmission shares the TCI state, the base station 110 may transmit the indication of the one or more uplink power control parameters and/or the UE 120 may determine the one or more uplink power control parameters based at least in part on whether the one or more uplink power control parameters are associated with the TCI state using the techniques described above.

As shown by reference number 715, the UE 120 may transmit (and the base station 110 may receive) the SRS transmission. The SRS transmission may be based at least in part on the one or more uplink power control parameters determined by the UE 120 and/or indicated by the base station 110. For example, the UE 120 may measure a particular type of reference signal as a pathloss reference signal indicated by the one or more uplink power control parameters and may adjust the Tx chain 302 of the UE 120 based at least in part on a result of the measurement. As another example, the UE 120 may adjust the Tx chain 302 of the UE 120 based at least in part on an amount of pathloss between the UE 120 and the base station 110 indicated by the one or more uplink power control parameters. As another example, the UE 120 may adjust the Tx chain 302 of the UE 120 based at least in part on a target receive power (e.g., a PO value) indicated by the one or more uplink power control parameters. As another example, the UE 120 may adjust the Tx chain 302 of the UE 120 based at least in part on a pathloss compensation factor (e.g., an alpha value) indicated by the one or more uplink power control parameters. As another example, the UE 120 may adjust the Tx chain 302 of the UE 120 based at least in part on a closed loop index (e.g., a closed loop index value) indicated by the one or more uplink power control parameters.

As indicated above, FIG. 7 is provided as an example. Other examples may differ from what is described with respect to FIG. 7.

Figure 8:
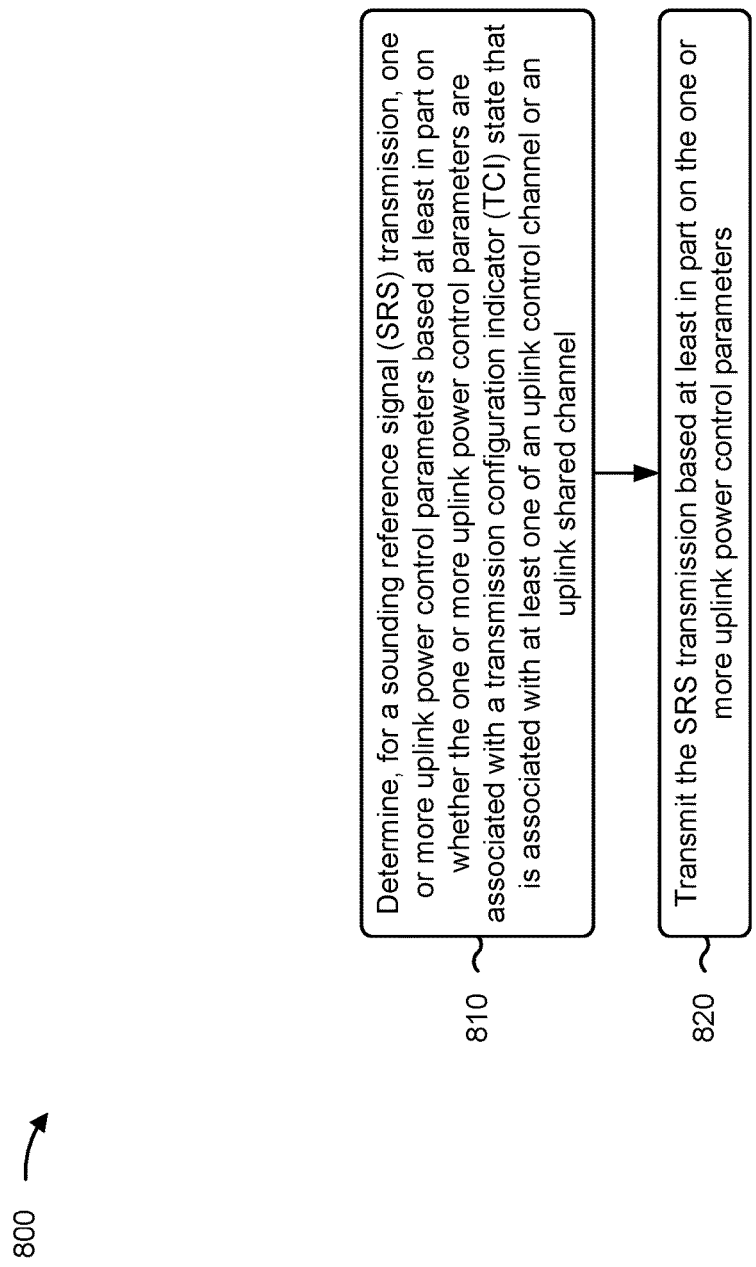
FIGS. 8 and 9 are diagrams illustrating example processes associated with indicating uplink power control parameters, in accordance with the present disclosure.

FIG. 8 is a diagram illustrating an example process 800 performed, for example, by a UE, in accordance with the present disclosure. Example process 800 is an example where the UE (e.g., UE 120) performs operations associated with indicating uplink power control parameters.

As shown in FIG. 8, in some aspects, process 800 may include determining, for an SRS transmission, one or more uplink power control parameters based at least in part on whether the one or more uplink power control parameters are associated with a TCI state that is associated with at least one of an uplink control channel or an uplink shared channel (block 810). For example, the UE (e.g., using communication manager 140 and/or determination component 1008, depicted in FIG. 10) may determine, for a SRS transmission, one or more uplink power control parameters based at least in part on whether the one or more uplink power control parameters are associated with a TCI state that is associated with at least one of an uplink control channel or an uplink shared channel, as described above.

As further shown in FIG. 8, in some aspects, process 800 may include transmitting the SRS transmission based at least in part on the one or more uplink power control parameters (block 820). For example, the UE (e.g., using communication manager 140 and/or transmission component 1004, depicted in FIG. 10) may transmit the SRS transmission based at least in part on the one or more uplink power control parameters, as described above.

Process 800 may include additional aspects, such as any single aspect or any combination of aspects described below and/or in connection with one or more other processes described elsewhere herein.

In a first aspect, the one or more uplink power control parameters include at least one of a target receive power, a pathloss compensation factor, a closed loop index, or a pathloss reference signal parameter.

In a second aspect, alone or in combination with the first aspect, the pathloss reference signal parameter indicates a reference signal that is to be measured for pathloss estimation and power control estimation.

In a third aspect, alone or in combination with one or more of the first and second aspects, the one or more uplink power control parameters are not associated with the TCI state that is associated with at least one of the uplink control channel or the uplink shared channel, and wherein determining the one or more uplink power control parameters comprises determining the one or more uplink power control parameters based at least in part on an SRS resource set associated with the SRS transmission.

In a fourth aspect, alone or in combination with one or more of the first through third aspects, the one or more uplink power control parameters are indicated in an SRS resource set information element, in a downlink communication, associated with the SRS resource set, or a parameter set identifier field, in the downlink communication, that indicates a parameter set identifier associated with the one or more uplink power control parameters, wherein the parameter set identifier is associated with the SRS resource set.

In a fifth aspect, alone or in combination with one or more of the first through fourth aspects, the one or more uplink power control parameters are not associated with the TCI state that is associated with at least one of the uplink control channel or the uplink shared channel, and wherein determining the one or more uplink power control parameters comprises determining the one or more uplink power control parameters based at least in part on an SRS resource associated with the SRS transmission.

In a sixth aspect, alone or in combination with one or more of the first through fifth aspects, the one or more uplink power control parameters are configured for the SRS resource.

In a seventh aspect, alone or in combination with one or more of the first through sixth aspects, the one or more uplink power control parameters are configured for an SRS resource set in which the SRS resource is included, and wherein determining the one or more uplink power control parameters comprises determining the one or more uplink power control parameters based at least in part on an SRS resource being included in the SRS resource set.

In an eighth aspect, alone or in combination with one or more of the first through seventh aspects, the one or more uplink power control parameters are indicated in an SRS resource information element, in a downlink communication, associated with the SRS resource, or a parameter set identifier field, in the downlink communication, that indicates a parameter set identifier associated with the one or more uplink power control parameters, wherein the parameter set identifier is associated with the SRS resource.

In a ninth aspect, alone or in combination with one or more of the first through eighth aspects, process 800 includes receiving an indication of updated one or more uplink power control parameters in a medium access control control element, wherein the updated one or more uplink power control parameters are associated with an SRS resource that is associated with the SRS transmission.

In a tenth aspect, alone or in combination with one or more of the first through ninth aspects, the one or more uplink power control parameters are associated with the TCI state that is associated with at least one of the uplink control channel or the uplink shared channel, and wherein determining the one or more uplink power control parameters comprises determining the one or more uplink power control parameters based at least in part on the one or more uplink power control parameters being associated with the TCI state.

In an eleventh aspect, alone or in combination with one or more of the first through tenth aspects, process 800 includes refraining from determining the one or more uplink power control parameters based at least in part on an indication of one or more other uplink power control parameters indicated in an SRS resource information element or in an SRS resource set information element.

In a twelfth aspect, alone or in combination with one or more of the first through eleventh aspects, the one or more uplink power control parameters are associated with the TCI state that is associated with at least one of the uplink control channel or the uplink shared channel, and wherein determining the one or more uplink power control parameters comprises determining the one or more uplink power control parameters based at least in part on at least one of an SRS resource associated with the SRS transmission, or an SRS resource set in which the SRS resource is included.

In a thirteenth aspect, alone or in combination with one or more of the first through twelfth aspects, process 800 includes refraining from determining the one or more uplink power control parameters based at least in part on an indication of one or more other uplink power control parameters that are associated with the TCI state.

In a fourteenth aspect, alone or in combination with one or more of the first through thirteenth aspects, process 800 includes transmitting an indication of a capability to support selectively using other uplink power control parameters that are not associated with the TCI state or the one or more uplink power control parameters associated with the TCI state.

In a fifteenth aspect, alone or in combination with one or more of the first through fourteenth aspects, at least one of an SRS resource associated with the SRS transmission, or an SRS resource set in which the SRS resource is included, shares the TCI state with at least one of the uplink control channel or the uplink shared channel.

In a sixteenth aspect, alone or in combination with one or more of the first through fifteenth aspects, at least one of an SRS resource associated with the SRS transmission, or an SRS resource set in which the SRS resource is included, is associated with another TCI state that is different from the TCI state associated with at least one of the uplink control channel or the uplink shared channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
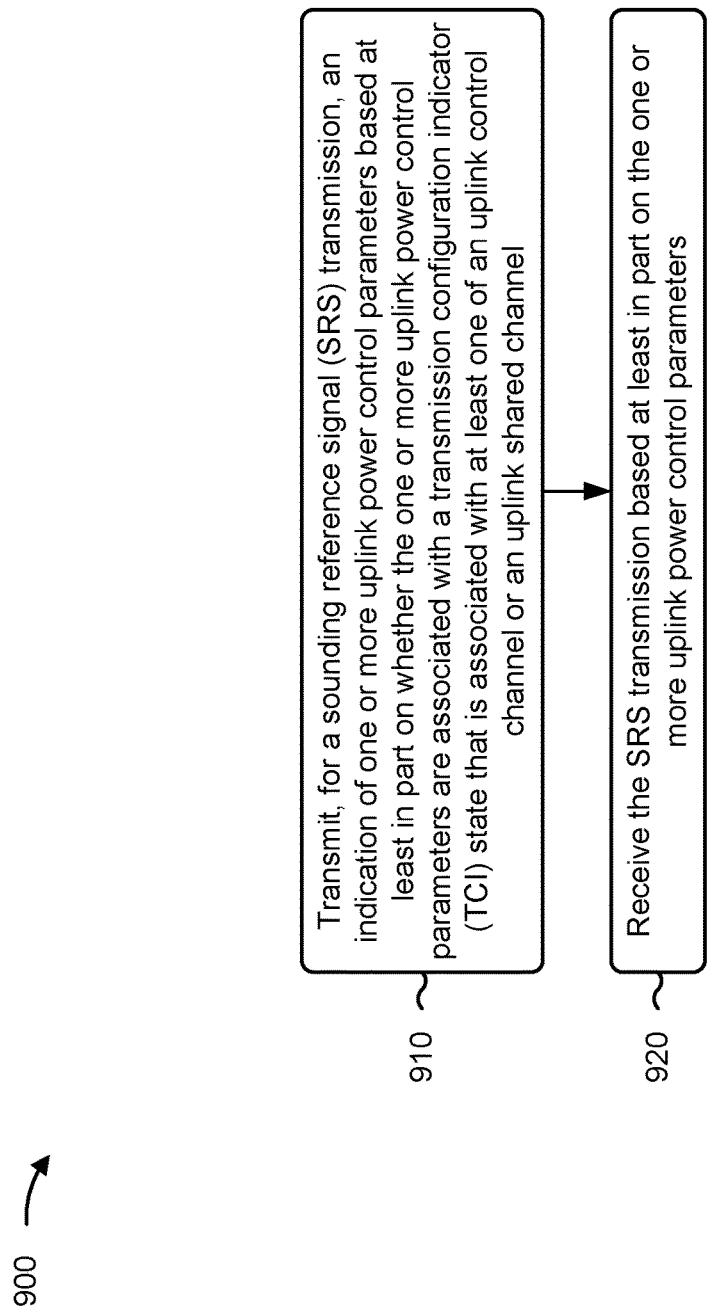

FIG. 9 is a diagram illustrating an example process 900 performed, for example, by a base station (e.g., a network node), in accordance with the present disclosure. Example process 900 is an example where the base station (e.g., base station 110) performs operations associated with indicating uplink power control parameters.

As shown in FIG. 9, in some aspects, process 900 may include transmitting, for an SRS transmission, an indication of one or more uplink power control parameters based at least in part on whether the one or more uplink power control parameters are associated with a TCI state that is associated with at least one of an uplink control channel or an uplink shared channel (block 910). For example, the base station (e.g., using communication manager 150 and/or transmission component 1104, depicted in FIG. 11) may transmit, for an SRS transmission, an indication of one or more uplink power control parameters based at least in part on whether the one or more uplink power control parameters are associated with a TCI state that is associated with at least one of an uplink control channel or an uplink shared channel, as described above.

As further shown in FIG. 9, in some aspects, process 900 may include receiving the SRS transmission based at least in part on the one or more uplink power control parameters (block 920). For example, the base station (e.g., using communication manager 150 and/or reception component 1102, depicted in FIG. 11) may receive the SRS transmission based at least in part on the one or more uplink power control parameters, as described above.

Process 900 may include additional aspects, such as any single aspect or any combination of aspects described below and/or in connection with one or more other processes described elsewhere herein.

In a first aspect, the one or more uplink power control parameters include at least one of a target receive power, a pathloss compensation factor, a closed loop index, or a pathloss reference signal parameter.

In a second aspect, alone or in combination with the first aspect, the pathloss reference signal parameter indicates a reference signal that is to be measured for pathloss estimation and power control estimation.

In a third aspect, alone or in combination with one or more of the first and second aspects, the one or more uplink power control parameters are not associated with the TCI state that is associated with at least one of the uplink control channel or the uplink shared channel, and wherein transmitting the indication of the one or more uplink power control parameters comprises transmitting the indication of the one or more uplink power control parameters in an SRS resource set information element associated with the SRS transmission.

In a fourth aspect, alone or in combination with one or more of the first through third aspects, the one or more uplink power control parameters are not associated with the TCI state that is associated with at least one of the uplink control channel or the uplink shared channel, and wherein transmitting the indication of the one or more uplink power control parameters comprises transmitting the indication of the one or more uplink power control parameters in a parameter set identifier field that indicates a parameter set identifier associated with the one or more uplink power control parameters, wherein the parameter set identifier is associated with an SRS resource set that is associated with the SRS transmission.

In a fifth aspect, alone or in combination with one or more of the first through fourth aspects, the one or more uplink power control parameters are not associated with the TCI state that is associated with at least one of the uplink control channel or the uplink shared channel, and wherein transmitting the indication of the one or more uplink power control parameters comprises transmitting the indication of the one or more uplink power control parameters in an SRS resource information element associated with the SRS transmission.

In a sixth aspect, alone or in combination with one or more of the first through fifth aspects, the one or more uplink power control parameters are not associated with the TCI state that is associated with at least one of the uplink control channel or the uplink shared channel, and wherein transmitting the indication of the one or more uplink power control parameters comprises transmitting the indication of the one or more uplink power control parameters in a parameter set identifier field that indicates a parameter set identifier associated with the one or more uplink power control parameters, wherein the parameter set identifier is associated with an SRS resource that is associated with the SRS transmission.

In a seventh aspect, alone or in combination with one or more of the first through sixth aspects, process 900 includes transmitting an indication of updated one or more uplink power control parameters in a medium access control control element, wherein the updated one or more uplink power control parameters are associated with an SRS resource that is associated with the SRS transmission.

In an eighth aspect, alone or in combination with one or more of the first through seventh aspects, the one or more uplink power control parameters are associated with the TCI state that is associated with at least one of the uplink control channel or the uplink shared channel, and wherein transmitting the indication of the one or more uplink power control parameters comprises transmitting the indication of the TCI state.

In a ninth aspect, alone or in combination with one or more of the first through eighth aspects, the one or more uplink power control parameters are associated with the TCI state that is associated with at least one of the uplink control channel or the uplink shared channel, and wherein transmitting the indication of the one or more uplink power control parameters comprises transmitting the indication of the one or more uplink power control parameters in at least one of an SRS resource information element associated with the SRS transmission, or an SRS resource set information element associated with the SRS transmission.

In a tenth aspect, alone or in combination with one or more of the first through ninth aspects, process 900 includes receiving, from a UE, an indication of a capability to support selectively using other uplink power control parameters that are not associated with the TCI state or the one or more uplink power control parameters associated with the TCI state, and transmitting, to the UE, the indication of the one or more uplink power control parameters based at least in part on the capability.

In an eleventh aspect, alone or in combination with one or more of the first through tenth aspects, at least one of an SRS resource associated with the SRS transmission, or an SRS resource set in which the SRS resource is included, shares the TCI state with at least one of the uplink control channel or the uplink shared channel.

In a twelfth aspect, alone or in combination with one or more of the first through eleventh aspects, at least one of an SRS resource associated with the SRS transmission, or an SRS resource set in which the SRS resource is included, is associated with another TCI state that is different from the TCI state associated with at least one of the uplink control channel or the uplink shared channel.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
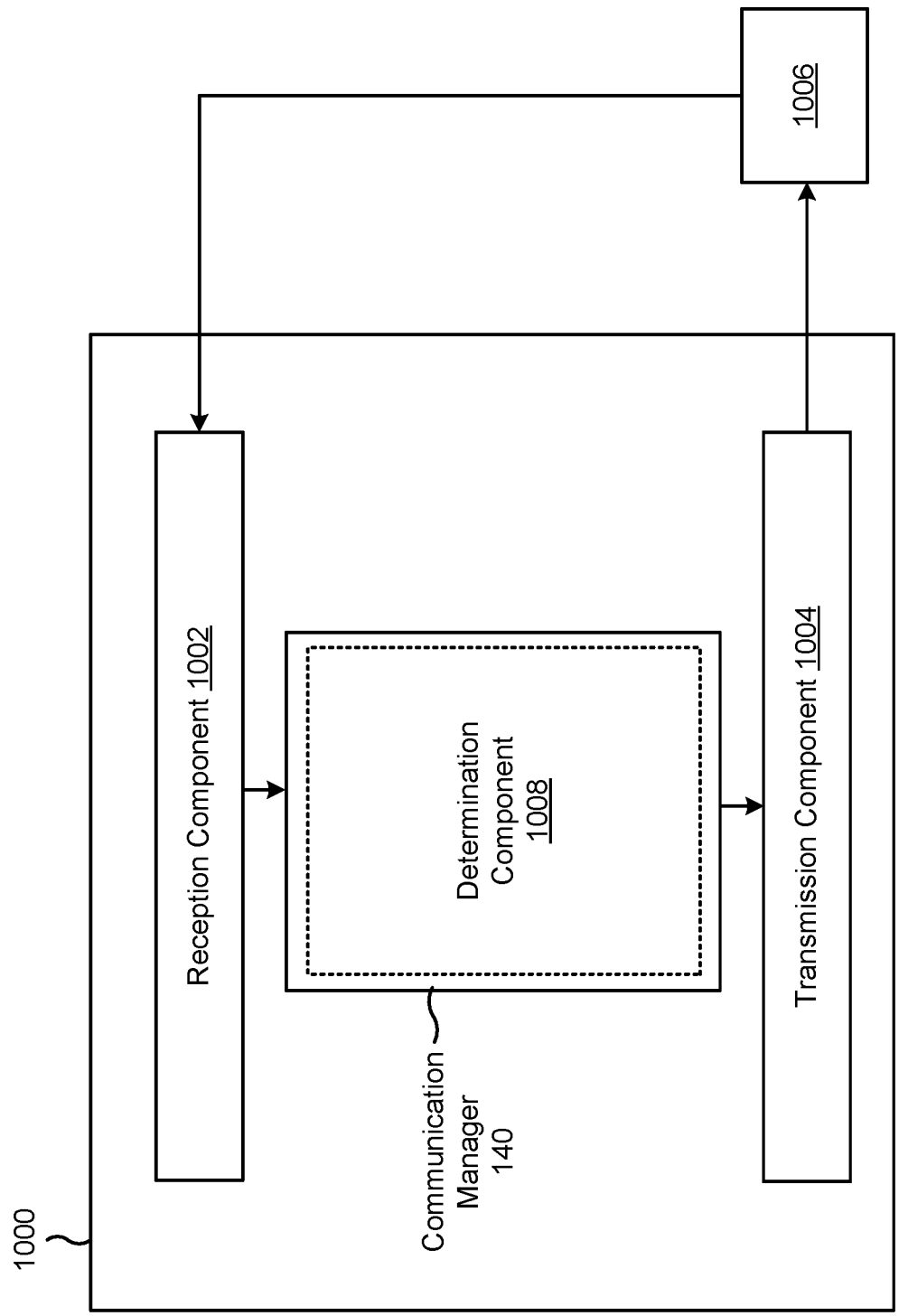

FIG. 10 is a diagram of an example apparatus 1000 for wireless communication. The apparatus 1000 may be a UE, or a UE may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 140. The communication manager 140 may include a determination component 1008, among other examples.

In some aspects, the apparatus 1000 may be configured to perform one or more operations described herein in connection with FIGS. 3-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the UE described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the UE described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component

1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the UE described in connection with FIG. 2. In some aspects, the transmission component 1004 may be co-located with the reception component 1002 in a transceiver.

The determination component 1008 may determine, for an SRS transmission, one or more uplink power control parameters based at least in part on whether the one or more uplink power control parameters are associated with a TCI state that is associated with at least one of an uplink control channel or an uplink shared channel. The transmission component 1004 may transmit (e.g., to the apparatus 1006) the SRS transmission based at least in part on the one or more uplink power control parameters.

In some aspects, the reception component 1002 may receive (e.g., from the apparatus 1006) an indication of updated one or more uplink power control parameters in a medium access control control element wherein the updated one or more uplink power control parameters are associated with an SRS resource that is associated with the SRS transmission.

In some aspects, the determination component 1008 may refrain from determining the one or more uplink power control parameters based at least in part on an indication of one or more other uplink power control parameters indicated in an SRS resource information element or in an SRS resource set information element.

In some aspects, the determination component 1008 may refrain from determining the one or more uplink power control parameters based at least in part on an indication of one or more other uplink power control parameters that are associated with the TCI state.

In some aspects, the transmission component 1004 may transmit (e.g., to the apparatus 1006) an indication of a capability to support selectively using other uplink power control parameters that are not associated with the TCI state or the one or more uplink power control parameters associated with the TCI state.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

FIG. 11 is a diagram of an example apparatus 1100 for wireless communication. The apparatus 1100 may be a base station, or a base station may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 150.

In some aspects, the apparatus 1100 may be configured to perform one or more operations described herein in connection with FIGS. 4-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the base station described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the base station described in connection with FIG. 2. In some aspects, the transmission component 1104 may be co-located with the reception component 1102 in a transceiver.

The transmission component 1104 may transmit (e.g., to the apparatus 1106), for an SRS transmission, an indication of one or more uplink power control parameters based at least in part on whether the one or more uplink power control parameters are associated with a TCI state that is associated with at least one of an uplink control channel or an uplink shared channel. The reception component 1102 may receive (e.g., from the apparatus 1106) the SRS transmission based at least in part on the one or more uplink power control parameters.

In some aspects, the transmission component 1104 may transmit (e.g., to the apparatus 1106) an indication of updated one or more uplink power control parameters in a medium access control control element wherein the updated one or more uplink power control parameters are associated with an SRS resource that is associated with the SRS transmission.

In some aspects, the reception component 1102 may receive, from the apparatus 1106, an indication of a capability to support selectively using other uplink power control parameters that are not associated with the TCI state or the one or more uplink power control parameters associated with the TCI state. In some aspects, the transmission component 1104 may transmit, to the apparatus 1106, the indication of the one or more uplink power control parameters based at least in part on the capability.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a user equipment (UE), comprising: determining, for a sounding reference signal (SRS) transmission, one or more uplink power control parameters based at least in part on whether the one or more uplink power control parameters are associated with a transmission configuration indicator (TCI) state that is associated with at least one of an uplink control channel or an uplink shared channel; and transmitting the SRS transmission based at least in part on the one or more uplink power control parameters.

Aspect 2: The method of Aspect 1, wherein the one or more uplink power control parameters include at least one of: a target receive power, a pathloss compensation factor, a closed loop index, or a pathloss reference signal parameter.

Aspect 3: The method of Aspect 2, wherein the pathloss reference signal parameter indicates a reference signal that is to be measured for pathloss estimation and power control estimation.

Aspect 4: The method of one or more of Aspects 1-3, wherein the one or more uplink power control parameters are not associated with the TCI state that is associated with at least one of the uplink control channel or the uplink shared channel; and wherein determining the one or more uplink power control parameters comprises: determining the one or more uplink power control parameters based at least in part on an SRS resource set associated with the SRS transmission.

Aspect 5: The method of Aspect 4, wherein the one or more uplink power control parameters are indicated in: an SRS resource set information element, in a downlink communication, associated with the SRS resource set, or a parameter set identifier field, in the downlink communication, that indicates a parameter set identifier associated with the one or more uplink power control parameters, wherein the parameter set identifier is associated with the SRS resource set.

Aspect 6: The method of one or more of Aspects 1-5, wherein the one or more uplink power control parameters are not associated with the TCI state that is associated with at least one of the uplink control channel or the uplink shared channel; and wherein determining the one or more uplink power control parameters comprises: determining the one or more uplink power control parameters based at least in part on an SRS resource associated with the SRS transmission.

Aspect 7: The method of Aspect 6, wherein the one or more uplink power control parameters are configured for the SRS resource.

Aspect 8: The method of Aspect 6 or 7, wherein the one or more uplink power control parameters are configured for an SRS resource set in which the SRS resource is included; and wherein determining the one or more uplink power control parameters comprises: determining the one or more uplink power control parameters based at least in part on an SRS resource being included in the SRS resource set.

Aspect 9: The method of one or more of Aspects 6-8, wherein the one or more uplink power control parameters are indicated in: an SRS resource information element, in a downlink communication, associated with the SRS resource, or a parameter set identifier field, in the downlink communication, that indicates a parameter set identifier associated with the one or more uplink power control parameters, wherein the parameter set identifier is associated with the SRS resource.

Aspect 10: The method of one or more of Aspects 1-9, further comprising: receiving an indication of updated one or more uplink power control parameters in a medium access control control element, wherein the updated one or more uplink power control parameters are associated with an SRS resource that is associated with the SRS transmission.

Aspect 11: The method of one or more of Aspects 1-10, wherein the one or more uplink power control parameters are associated with the TCI state that is associated with at least one of the uplink control channel or the uplink shared channel; and wherein determining the one or more uplink power control parameters comprises: determining the one or more uplink power control parameters based at least in part on the one or more uplink power control parameters being associated with the TCI state.

Aspect 12: The method of Aspect 11, further comprising: refraining from determining the one or more uplink power control parameters based at least in part on an indication of one or more other uplink power control parameters indicated in an SRS resource information element or in an SRS resource set information element.

Aspect 13: The method of one or more of Aspects 1-12, wherein the one or more uplink power control parameters are associated with the TCI state that is associated with at least one of the uplink control channel or the uplink shared channel; and wherein determining the one or more uplink power control parameters comprises: determining the one or more uplink power control parameters based at least in part on at least one of an SRS resource associated with the SRS transmission, or an SRS resource set in which the SRS resource is included.

Aspect 14: The method of one or more of Aspects 11-13, further comprising: refraining from determining the one or more uplink power control parameters based at least in part on an indication of one or more other uplink power control parameters that are associated with the TCI state.

Aspect 15: The method of one or more of Aspects 11-14, further comprising: transmitting an indication of a capability to support selectively using other uplink power control parameters that are not associated with the TCI state or the one or more uplink power control parameters associated with the TCI state.

Aspect 16: The method of one or more of Aspects 1-15, wherein at least one of an SRS resource associated with the SRS transmission, or an SRS resource set in which the SRS resource is included, shares the TCI state with at least one of the uplink control channel or the uplink shared channel.

Aspect 17: The method of one or more of Aspects 1-16, wherein at least one of an SRS resource associated with the SRS transmission, or an SRS resource set in which the SRS resource is included, is associated with another TCI state that is different from the TCI state associated with at least one of the uplink control channel or the uplink shared channel.

Aspect 18: A method of wireless communication performed by a base station, comprising: transmitting, for a sounding reference signal (SRS) transmission, an indication of one or more uplink power control parameters based at least in part on whether the one or more uplink power control parameters are associated with a transmission configuration indicator (TCI) state that is associated with at least one of an uplink control channel or an uplink shared channel; and receiving the SRS transmission based at least in part on the one or more uplink power control parameters.

Aspect 19: The method of Aspect 18, wherein the one or more uplink power control parameters include at least one of: a target receive power, a pathloss compensation factor, a closed loop index, or a pathloss reference signal parameter.

Aspect 20: The method of Aspect 19, wherein the pathloss reference signal parameter indicates a reference signal that is to be measured for pathloss estimation and power control estimation.

Aspect 21: The method of one or more of Aspects 18-20, wherein the one or more uplink power control parameters are not associated with the TCI state that is associated with at least one of the uplink control channel or the uplink shared channel; and wherein transmitting the indication of the one or more uplink power control parameters comprises: transmitting the indication of the one or more uplink power control parameters in an SRS resource set information element associated with the SRS transmission.

Aspect 22: The method of one or more of Aspects 18-21, wherein the one or more uplink power control parameters are not associated with the TCI state that is associated with at least one of the uplink control channel or the uplink shared channel; and wherein transmitting the indication of the one or more uplink power control parameters comprises: transmitting the indication of the one or more uplink power control parameters in a parameter set identifier field that indicates a parameter set identifier associated with the one or more uplink power control parameters, wherein the parameter set identifier is associated with an SRS resource set that is associated with the SRS transmission.

Aspect 23: The method of one or more of Aspects 18-22, wherein the one or more uplink power control parameters are not associated with the TCI state that is associated with at least one of the uplink control channel or the uplink shared channel; and wherein transmitting the indication of the one or more uplink power control parameters comprises: transmitting the indication of the one or more uplink power control parameters in an SRS resource information element associated with the SRS transmission.

Aspect 24: The method of one or more of Aspects 18-23, wherein the one or more uplink power control parameters are not associated with the TCI state that is associated with at least one of the uplink control channel or the uplink shared channel; and wherein transmitting the indication of the one or more uplink power control parameters comprises: transmitting the indication of the one or more uplink power control parameters in a parameter set identifier field that indicates a parameter set identifier associated with the one or more uplink power control parameters, wherein the parameter set identifier is associated with an SRS resource that is associated with the SRS transmission.

Aspect 25: The method of one or more of Aspects 18-24, further comprising: transmitting an indication of updated one or more uplink power control parameters in a medium access control control element, wherein the updated one or more uplink power control parameters are associated with an SRS resource that is associated with the SRS transmission.

Aspect 26: The method of one or more of Aspects 18-25, wherein the one or more uplink power control parameters are associated with the TCI state that is associated with at least one of the uplink control channel or the uplink shared channel; and wherein transmitting the indication of the one or more uplink power control parameters comprises: transmitting the indication of the TCI state.

Aspect 27: The method of one or more of Aspects 18-26, wherein the one or more uplink power control parameters are associated with the TCI state that is associated with at least one of the uplink control channel or the uplink shared channel; and wherein transmitting the indication of the one or more uplink power control parameters comprises: transmitting the indication of the one or more uplink power control parameters in at least one of an SRS resource information element associated with the SRS transmission, or an SRS resource set information element associated with the SRS transmission.

Aspect 28: The method of Aspect 27, further comprising: receiving, from a user equipment (UE), an indication of a capability to support selectively using other uplink power control parameters that are not associated with the TCI state or the one or more uplink power control parameters associated with the TCI state; and transmitting, to the UE, the indication of the one or more uplink power control parameters based at least in part on the capability.

Aspect 29: The method of one or more of Aspects 18-28, wherein at least one of an SRS resource associated with the SRS transmission, or an SRS resource set in which the SRS resource is included, shares the TCI state with at least one of the uplink control channel or the uplink shared channel.

Aspect 30: The method of one or more of Aspects 18-29, wherein at least one of an SRS resource associated with the SRS transmission, or an SRS resource set in which the SRS resource is included, is associated with another TCI state that is different from the TCI state associated with at least one of the uplink control channel or the uplink shared channel.

Aspect 31: An apparatus for wireless communication at a device, comprising a processor; memory coupled with the processor; and instructions stored in the memory and executable by the processor to cause the apparatus to perform the method of one or more of Aspects 1-17.

Aspect 32: A device for wireless communication, comprising a memory and one or more processors coupled to the memory, the one or more processors configured to perform the method of one or more of Aspects 1-17.

Aspect 33: An apparatus for wireless communication, comprising at least one means for performing the method of one or more of Aspects 1-17.

Aspect 34: A non-transitory computer-readable medium storing code for wireless communication, the code comprising instructions executable by a processor to perform the method of one or more of Aspects 1-17.

Aspect 35: A non-transitory computer-readable medium storing a set of instructions for wireless communication, the set of instructions comprising one or more instructions that, when executed by one or more processors of a device, cause the device to perform the method of one or more of Aspects 1-17.

Aspect 36: An apparatus for wireless communication at a device, comprising a processor; memory coupled with the processor; and instructions stored in the memory and executable by the processor to cause the apparatus to perform the method of one or more of Aspects 18-30.

Aspect 37: A device for wireless communication, comprising a memory and one or more processors coupled to the memory, the one or more processors configured to perform the method of one or more of Aspects 18-30.

Aspect 38: An apparatus for wireless communication, comprising at least one means for performing the method of one or more of Aspects 18-30.

Aspect 39: A non-transitory computer-readable medium storing code for wireless communication, the code comprising instructions executable by a processor to perform the method of one or more of Aspects 18-30.

Aspect 40: A non-transitory computer-readable medium storing a set of instructions for wireless communication, the set of instructions comprising one or more instructions that, when executed by one or more processors of a device, cause the device to perform the method of one or more of Aspects 18-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    determining one or more uplink power control parameters for a sounding reference signal (SRS) transmission based at least in part on whether the one or more uplink power control parameters are associated with a transmission configuration indicator (TCI) state that is associated with at least one of an uplink control channel or an uplink shared channel,
        wherein determining the one or more uplink power control parameters comprises determining the one or more uplink power control parameters based at least in part on an SRS resource that is associated with a different TCI state than the TCI state that is associated with the at least one of the uplink control channel or the uplink shared channel; and
    transmitting the SRS transmission based at least in part on the one or more uplink power control parameters.

2. The method of claim 1, wherein the one or more uplink power control parameters include at least one of:
    a target receive power,
    a pathloss compensation factor,
    a closed loop index, or
    a pathloss reference signal parameter.

3. The method of claim 2, wherein the pathloss reference signal parameter indicates a reference signal that is to be measured for pathloss estimation and power control estimation.

4. The method of claim 1, wherein
the method further comprises:
  determining the one or more uplink power control parameters based at least in part on an SRS resource set associated with the SRS transmission.

5. The method of claim 4, wherein the one or more uplink power control parameters are configured for the SRS resource and the SRS resource is included in the SRS resource set; and
wherein the method further comprises:
  determining the one or more uplink power control parameters based at least in part on the SRS resource being included in the SRS resource set.

6. The method of claim 1, wherein the one or more uplink power control parameters are configured for the SRS resource.

7. The method of claim 1, wherein the indication is received in a parameter set identifier field that indicates a parameter set identifier associated with the one or more uplink power control parameters, and wherein the parameter set identifier is associated with the SRS resource.

8. The method of claim 1, further comprising:
refraining from determining the one or more uplink power control parameters as uplink power control parameters associated with the TCI state that is associated with the at least one of the uplink control channel or the uplink shared channel.

9. The method of claim 1, further comprising:
transmitting an indication of a capability to support using uplink power control parameters that are not associated with the TCI state that is associated with the at least one of the uplink control channel or the uplink shared channel or uplink power control parameters associated with the TCI state that is associated with the at least one of the uplink control channel or the uplink shared channel.

10. The method of claim 1, wherein determining the one or more uplink power control parameters based at least in part on the SRS resource that is associated with the different TCI state is based at least in part on the one or more uplink power control parameters not being associated with the TCI state that is associated with the at least one of the uplink control channel or the uplink shared channel.

11. The method of claim 1, further comprising:
determining one or more uplink power control parameters for SRS transmissions based at least in part on the SRS transmissions sharing the TCI state that is associated with the at least one of the uplink control channel or the uplink shared channel.

12. A user equipment (UE) for wireless communication, comprising:
memory; and
one or more processors, coupled to the memory, configured to:
  determine one or more uplink power control parameters for a sounding reference signal (SRS) transmission based at least in part on whether the one or more uplink power control parameters are associated with a transmission configuration indicator (TCI) state that is associated with at least one of an uplink control channel or an uplink shared channel,
  wherein the one or more processors are configured to determine the one or more uplink power control parameters by being configured to determine the one or more uplink power control parameters based at least in part on an SRS resource that is associated with a different TCI state than the TCI state that is associated with the at least one of the uplink control channel or the uplink shared channel; and
  transmit the SRS transmission based at least in part on the one or more uplink power control parameters.

13. The UE of claim 12, wherein
the one or more processors are further configured to:
determine the one or more uplink power control parameters based at least in part on an SRS resource set associated with the SRS transmission.

14. The UE of claim 13, wherein the indication is received in a parameter set identifier field that indicates a parameter set identifier associated with the one or more uplink power control parameters, and wherein the parameter set identifier is associated with the SRS resource.

15. The UE of claim 12, wherein the one or more processors are further configured to:
receive an indication of updated one or more uplink power control parameters in a medium access control control element.

16. The UE of claim 12, wherein an SRS resource set which includes the SRS resource is associated with the different TCI state.

17. The UE of claim 12, wherein the one or more processors are configured to determine the one or more uplink power control parameters based at least in part on the SRS resource that is associated with the different TCI state based at least in part on the one or more uplink power control parameters not being associated with the TCI state that is associated with the at least one of the uplink control channel or the uplink shared channel.

18. The UE of claim 12, wherein the one or more processors are further configured to:
determine one or more uplink power control parameters for SRS transmissions based at least in part on the SRS transmissions sharing the TCI state that is associated with the at least one of the uplink control channel or the uplink shared channel.

19. A method of wireless communication performed by a base station, comprising:
transmitting, for a sounding reference signal (SRS) transmission, an indication of one or more uplink power control parameters determined based at least in part on whether the one or more uplink power control parameters are associated with a transmission configuration indicator (TCI) state that is associated with at least one of an uplink control channel or an uplink shared channel,
  wherein the one or more uplink power control parameters are determined based at least in part on an SRS resource that is associated with a different TCI state than the TCI state that is associated with the at least one of the uplink control channel or the uplink shared channel; and
receiving the SRS transmission based at least in part on the one or more uplink power control parameters.

20. The method of claim 19, wherein the one or more uplink power control parameters include at least one of:
a target receive power,
a pathloss compensation factor,
a closed loop index, or
a pathloss reference signal parameter.

21. The method of claim 20, wherein the pathloss reference signal parameter indicates a reference signal that is to be measured for pathloss estimation and power control estimation.

22. The method of claim 19, wherein
transmitting the indication of the one or more uplink power control parameters comprises:
transmitting the indication of the one or more uplink power control parameters in an SRS resource information element associated with the SRS transmission.

23. The method of claim 19, wherein the indication is received in a parameter set identifier field that indicates a parameter set identifier associated with the one or more uplink power control parameters, and wherein the parameter set identifier is associated with the SRS resource.

24. The method of claim 19, wherein
transmitting the indication of the one or more uplink power control parameters comprises:
transmitting the indication of the one or more uplink power control parameters in an SRS resource set information element associated with the SRS transmission.

25. The method of claim 19, wherein the indication is received via a parameter set identifier field that indicates a parameter set identifier associated with the one or more uplink power control parameters, and wherein the parameter set identifier is associated with an SRS resource set that is associated with the SRS transmission.

26. The method of claim 19, further comprising:
transmitting an indication of updated one or more uplink power control parameters in a medium access control control element.

27. A base station for wireless communication, comprising:
memory; and
one or more processors, coupled to the memory, configured to:
transmit, for a sounding reference signal (SRS) transmission, an indication of one or more uplink power control parameters determined based at least in part on whether the one or more uplink power control parameters are associated with a transmission configuration indicator (TCI) state that is associated with at least one of an uplink control channel or an uplink shared channel,
wherein the one or more uplink power control parameters are determined based at least in part on an SRS resource that is associated with a different TCI state than the TCI state that is associated with the at least one of the uplink control channel or the uplink shared channel; and
receive the SRS transmission based at least in part on the one or more uplink power control parameters.

28. The base station of claim 27, wherein
the one or more processors are further configured to:
transmit the indication of the one or more uplink power control parameters in at least one of an SRS resource information element associated with the SRS transmission, or an SRS resource set information element associated with the SRS transmission.

29. The base station of claim 27, wherein an SRS resource set which includes the SRS resource is associated with the different TCI state.

30. The base station of claim 27, wherein the one or more uplink power control parameters are determined based at least in part on the SRS resource that is associated with the different TCI state based at least in part on the one or more uplink power control parameters not being associated with the TCI state that is associated with the at least one of the uplink control channel or the uplink shared channel.

* * * * *